(12) United States Patent
Kumada et al.

(10) Patent No.: US 7,920,308 B2
(45) Date of Patent: Apr. 5, 2011

(54) IMAGE PROCESSING APPARATUS AND IMAGE PROCESSING METHOD

(75) Inventors: Shuiichi Kumada, Yokohama (JP); Kazumi Chiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 11/422,005

(22) Filed: Jun. 2, 2006

(65) Prior Publication Data

US 2006/0274341 A1    Dec. 7, 2006

(30) Foreign Application Priority Data

Jun. 7, 2005    (JP) .................................. 2005-167349

(51) Int. Cl.
*H04N 1/40* (2006.01)
*G03F 3/08* (2006.01)
*G06K 9/00* (2006.01)

(52) U.S. Cl. ......................... 358/518; 358/3.24; 382/167

(58) Field of Classification Search ................. 358/1.9, 358/3.24, 1.1, 1.15, 518; 345/418, 593, 594; 382/162, 166, 167

See application file for complete search history.

(56) References Cited

U.S. PATENT DOCUMENTS

| | | | |
|---|---|---|---|
| 5,949,427 A | 9/1999 | Nishikawa et al. | |
| 6,603,483 B1 * | 8/2003 | Newman | 345/593 |
| 6,816,168 B2 | 11/2004 | Kumada et al. | 345/589 |
| 6,987,519 B2 | 1/2006 | Kumada et al. | 345/603 |
| 7,027,184 B2 | 4/2006 | Matsui | |
| 7,054,029 B1 | 5/2006 | Ohta et al. | |
| 7,062,087 B1 * | 6/2006 | Varga | 382/166 |
| 7,164,493 B1 * | 1/2007 | Matsumoto et al. | 358/1.9 |
| 2002/0051193 A1 * | 5/2002 | Oki | 358/1.15 |
| 2004/0136020 A1 | 7/2004 | Kumada | 358/1.9 |
| 2005/0151983 A1 * | 7/2005 | Harrington | 358/1.9 |
| 2006/0132480 A1 * | 6/2006 | Muller | 345/418 |

FOREIGN PATENT DOCUMENTS

| | | |
|---|---|---|
| EP | 1 102 478 A2 | 5/2001 |
| JP | 7-105344 | 4/1995 |
| JP | 9-009082 | 1/1997 |
| JP | 2001-189841 | 7/2001 |
| JP | 2001-218079 | 8/2001 |
| JP | 2001-236191 | 8/2001 |
| JP | 2002-016783 | 1/2002 |

OTHER PUBLICATIONS

Office Action dated Aug. 28, 2009 in JP 2005-167349.
Adobe Systems, Dec. 21, 1991, "PostScript Language Reference Manual, Second Edition", first printing, Akio Fujii / ASCII Corporation, p. 325-328 (with concise explanation of relevance).
Office Action dated Feb. 8, 2010 in JP 2005-167349.

* cited by examiner

*Primary Examiner* — James A Thompson
(74) *Attorney, Agent, or Firm* — Fitzpatrick, Cella, Harper & Scinto

(57) ABSTRACT

A rendering of objects described by description language into bitmap data is performed. As color space compression, the bitmap data in which the rendering has been performed is compressed in a color reproduction range.

13 Claims, 31 Drawing Sheets

(L*a*b*COLOR SPACE)

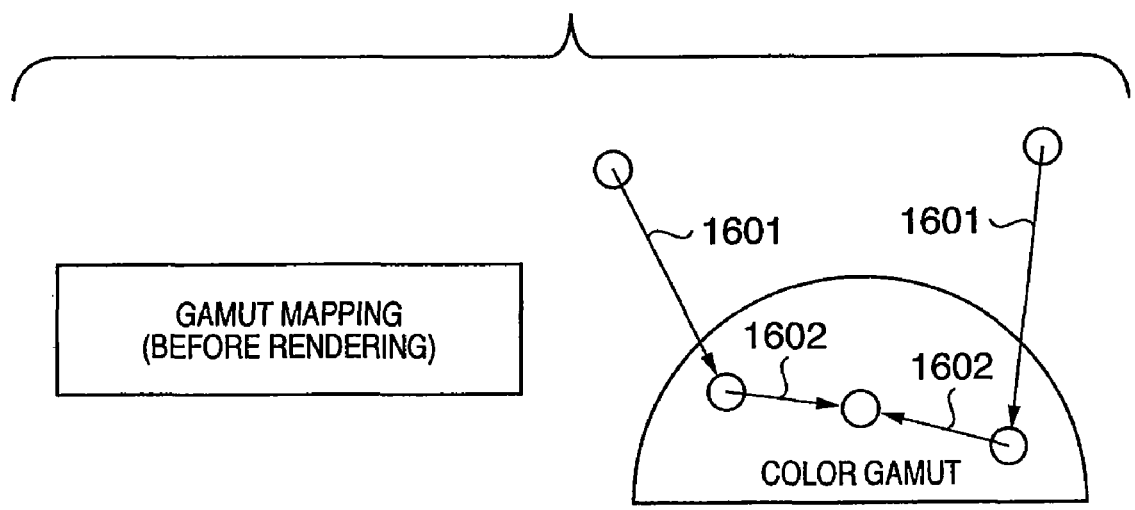
F I G. 16

IMAGE PROCESSING APPARATUS AND IMAGE PROCESSING METHOD

FIELD OF THE INVENTION

The present invention relates to a technique for applying a gamut mapping processing to each inputted object and outputting it.

BACKGROUND OF THE INVENTION

Gamut Mapping Method

Though a user expects that a color reproduced on a monitor is perceptually identical to a color of an image outputted by a printer, it is very difficult for a color reproduction technique to have a color image on the monitor perceptually identical to the image outputted by the printer. A main cause of this is that a color gamut of the monitor and a color gamut of the printer are different.

FIG. 1A is a diagram showing difference of the color gamuts between sRGB and printed CMYK. In consideration of the difference of the color gamuts as shown in FIG. 1A, the color reproduction technique for appropriately reproducing the color represented on the monitor by a computer, actually by use of color materials of a printing device, has become important.

Therefore, in order to contemplate the perceptual identity of displayed color images between such display media having different color gamuts, a technique for having one color gamut correspond to another color gamut in a uniform color specification system is required. Actually, in order to fit one color gamut into another color reproduction range, its color space is compressed. This color space compression is referred to as "Gamut Mapping", and a gamut mapping method for realizing this is referred to as "Gamut Mapping Algorithm (GMA)".

For GMA, various methods have been designed, such as a method for mapping of a color reproduction in a state where a chroma is maintained as shown in FIG. 1B, a method for mapping of the color reproduction with a lightness being maintained as shown in FIG. 1C, and the like.

<Color Matching with an ICC (International Color Consortium) Profile>

FIG. 2 is a diagram showing a flow of a general color matching process using an ICC profile. When RGB data is inputted, the color matching is performed on the RGB data based on a source profile and a destination profile, which have been set at a color management module (CMM), as well as GMA information describing a method of the color matching, and the data is outputted as CMYK data in which the color matching has been performed.

For processes of the GMA, there are three types of processes: Perceptual generally for outputting a photo-image, in which maintaining a relationship of tones is prioritized over a precise color reproduction of the image, Colorimetric for reproducing a logo and the like faithfully, and Saturation intended to maintain a bright impression of the original color without a high regard for a hue precision for vibrantly outputting a pie chart or characters. For color matching data for implementing these three types of methods, in an example of a printer profile as shown in FIG. 2, a transformation LUT (Look Up Table) from Lab to printer CMYK is prepared for each method of these three types, and the LUT corresponding to the GMA information which has been set is selected to be used for the color matching.

FIG. 3 is a block diagram showing configurations of a front-end server 301 as a controller of a conventional printer, and a printer engine 302. As shown in FIG. 3, the front-end server 301 as the controller of the printer is configured with a network I/F (interface) unit 310 for connecting to a network, a color management setting unit 311 for presetting a color management to be used by the user, a PDL interpreter unit 312 for analyzing PDL (page description language) to generate intermediate data, an intermediate data storage unit 313 for storing the intermediate data generated at the PDL interpreter unit 312, a communication interface unit 314 for exchanging the data with the printer engine 302, a rendering unit 315 for transforming the intermediate data in the intermediate data storage unit 313 into bitmap image data, a color management processing unit 316 for performing the color matching process set at the color management setting unit 311, a profile storage unit 316A for storing the profile to be used for the color matching, and a bitmap storage unit 317 for storing expanded bitmap image data.

Moreover, the printer engine 302 is configured with a communication I/F unit 320 for exchanging the data with the front-end server 301, and an output unit 321 for performing a print.

FIG. 4 is a diagram showing an example of a GUI (Graphical User Interface) for realizing the color management setting unit 311. Using this GUI, the user presets for each object attribute, in other words, in FIG. 4, the user presets GMA1 in the case where the object attribute is raster image, GMA2 in the case of vector graphics, or GMA3 in the case of text.

FIG. 5 is a flowchart showing a print process using the conventional front-end server 301 and the printer engine 302. First, the front-end server 301 receives PDL data via the network I/F unit 310 (S501), and the PDL interpreter unit 312 analyzes the PDL data (S502). Next, the color management processing unit 316 performs a GMA process with respect to color data of an object in the PDL data, based on the GMA information set at the color management setting unit 311 (S503). The GMA process will be further described.

Next, the PDL interpreter unit 312 generates the intermediate data from the PDL data including the color data on which the GMA process has been performed at the color management processing unit 316, and stores the intermediate data in the intermediate data storage unit 313 (S504) Next, the rendering unit 315 expands the intermediate data in the intermediate data storage unit 313 into the bitmap image data, and stores the bitmap image data in the bitmap storage unit 317 (S505). Then the bitmap image data is transformed into the printer CMYK (S506). Finally, the expanded bitmap image data is transferred to the printer engine 302 via the communication I/F unit 314, and the print is performed by the output unit 321 of the printer engine 302 (S507).

In this way, conventionally since the GMA process is performed prior to the rendering, there has been a characteristic in which the color space of the rendering is the color space (within the color reproduction) of the device (printer).

Here using FIG. 6, details of the GMA process With respect to the color data of the object in the PDL data at S503 as shown in FIG. 5 will be described. FIG. 6 is a flowchart showing the details of the GMA process with respect to the color data of the object in the PDL data.

First, it is determined whether the object attribute in the PDL data is an image or not (S601). If the object attribute is an image, the GMA information selected for the image is set to a Flag (S602), and the GMA process is performed (S603). Moreover, if the object attribute is not an image but vector graphics (YES at S604), the GMA information selected for vector graphics is set to the Flag (S605), and the GMA process is performed (S606).

On the contrary, if the object attribute is not an image or vector graphics but text (YES at S607), the GMA information selected for the text is set to the Flag (S608), and the GMA process is performed (S609). While the object exists (YES at S610), the above described process is repeated, and when there is not any object to be processed (NO at S610), this process is terminated.

Here using FIG. 7, the details of the GMA process at S603, S606 and S609 as shown in FIG. 6 will be described. FIG. 7 is a flowchart showing the details of the GMA process.

First, the source profile selected now is extracted (S701), and the destination profile is extracted (S702). Next, the type of GMA selected now (any one of the above described Perceptual, Colorimetric and Saturation) is set to a Rendering intent flag (S703). Then the source profile and the destination profile, as well as the Rendering intent flag which has been set with the type of GMA, are set to the CMM (S704), and the color matching process of the CMM is performed (S705).

<Description of the Color Matching Process>

A conventional color management system of color image data (for example, U.S. Pat. No. 6,603,483/Japanese Patent Laid-Open 2001-218079) will be briefly described.

FIG. 8 is a diagram for illustrating the color management module at a system level. As shown in FIG. 8, a color management module 801 creates a color transformation sequence based on a color management method which has been preset by the user, and transforms input image data 810 into output image data 820 by using color profiles 830 representing a color transformation procedure, and GMAs 840.

FIG. 9 is a diagram showing components of the color management module 801. As shown in FIG. 9, the color management module 801 includes a transformation sequence creation module (Create_Transform) 910 and a color transformation module (Transform_Colors) 920. This transformation sequence creation module 910 has an application programming interface (API) including three components: a color profile list, a GMA list and a transformation parameter. Here, the color profile list is a list of a plurality of color profiles used by the color transformation procedure that the user can set. The GMA list is a list of a plurality of types of GMTs which can be set in the color transformation procedure by the user. The transformation parameter is a parameter for indicating a storage location in which the color transformation sequence created with a transformation sequence creation can be arranged.

Moreover, the color transformation module 920 also has three components: the transformation parameter, input image data and output image data, with respect to the above described API. Here, the transformation parameter indicates the storage location in which the color transformation sequence created by the transformation sequence creation module 910 is arranged. The input image data is color image data transformed with the color transformation sequence corresponding to the transformation parameter by the user. The output image data is the color image data which has been transformed with the color transformation sequence based on the transformation parameter.

In this way, the user utilizes the transformation sequence creation module 910 to generate the color transformation sequence based on the profile list and the GMA list, applies the color transformation sequence to the input image data 810, and creates the output image data 820 through the color transformation 920.

FIG. 10 is a diagram for illustrating a structure of the color profile 830. As shown in FIG. 10, the color profile 830 is for creating and applying the color transformation sequence. The color profile 830 corresponds to a sequence of color profiles 1 to N required by the color management module 801, and provides color transformation information corresponding to a specific device which is required for the color transformation and the gamut mapping of the color image data. Moreover, in order to apply an appropriate GMA as indicated with the color transformation sequence according to the color management method which has been preset by the user, the gamut mapping algorithms (GMAs) 840 are provided.

It should be noted that the color profile 830 representatively relates to a particular image device such as the printer, a scanner, the monitor, a digital camera and the like. Here, the color profile corresponding to the particular device is referred to as "device color profile".

As shown in FIG. 10, the color profile 830 is configured with a color appearance transformation 1010, a color gamut boundary descriptor 1020 and a linearization table 1030. First, the color appearance transformation 1010 is used to transform the color image data from a device color space corresponding to the device to which the color profile 830 relates, into a device-independent color space. Also, the color appearance transformation 1010 is used to inversely transform the color image data from the device-independent color space into a device-dependent color space.

Next, the color gamut boundary descriptor 1020 is used to define a color gamut boundary of a color image device to which the color profile 830 corresponds. Thereby it is possible to map the color image data so that the color image data after mapping does not go out of the reproducible color gamut boundary of the color image device providing the mapped color image data by the gamut mapping. As a result, it is possible to render the color image data appropriately with the image device related to the color profile 830.

Next, the linearization table 1030 includes one or more linearization tables, which are utilized between the color appearance transformation and a gamut mapping transformation, in order to access the color appearance transformation 1010 and the color gamut boundary descriptor 1020 respectively.

FIG. 11 is a diagram for illustrating the color transformation sequence creation at the system level. A color profile list 1110 and a GMA list 1120 are provided as input into the transformation sequence creation module 910, and the color profile list 1110 has a plurality of reference entries including color profile references such as a color profile reference (1) 1111 to a color profile reference (N) 1112. Accordingly, the user can select one or more color profile references according to the color transformation procedure, with the color profile list 1110.

It should be noted that the color profile reference (1) 1111 to the color profile reference (N) 1112 correspond to the individual color profile as shown in FIG. 10.

The GMA list 1120 has a plurality of reference entries including a GMA reference selected by the user, such as a GMA reference (1) 1121 to a GMA reference (N) 1122.

The transformation sequence creation module 910 acquires the color appearance transformation 1010 and the linearization table 1030 from the color profiles 830 of the color profile references 1111 to 1112. In order to create a color transformation sequence 1130, the transformation sequence creation module 910 requires access to the color profiles 830 and the GMAs 840. Moreover, the GMAs 840 correspond to the GMAs of respective types which are treated as references in the GMA references 1121 to 1122.

Here the transformation sequence creation module 910 generates the color transformation sequence 1130 based on the color profile list 1110, the GMA list 1120, the color profiles 830 and the GMAs 840. The color transformation sequence 1130 includes a transformation step 1140 for transforming the color image data according to the color transformation procedure.

First, a profile step (1141) corresponds to the color appearance transformation acquired from the color profile in an input device which has provided the color image data, and thereby maps the color image data from the color space of the input device to the device-independent color space. Next, a gamut mapping step (1142) corresponds to the first GMA reference of the GMA list 1120, that is, the GMA reference 1121 in this case. The transformation sequence creation module 910 determines whether or not the transformation step should be created, for each color profile reference of the color profile list 1110, and for each GMA reference of the GMA list 1120.

Finally, a profile step (1143) is created if the last color profile reference, that is, the color profile reference (N) 1112, corresponds to the device color profile.

FIG. 12 is a diagram for illustrating a structure of the profile step. When the transformation sequence creation module 910 reads the color profile reference from the color profile list 1110, and determines that the profile step corresponding to the color profile reference should be created, the transformation sequence creation module 910 accesses an appropriate color profile from the color profiles 830. Then the transformation sequence creation module 910 extracts necessary data from the color profile, and creates the profile step.

As shown in FIG. 12, the profile step (1141) includes a color appearance transformation and table 1210. In this way, when the profile step (1141) is applied to the color image data, the profile step (1141) has data required for transforming the color image data appropriately, and copies an appropriate color appearance transformation and a corresponding table from the appropriate color profile. Here the color appearance transformation and table 1210 is configured with the data acquired from the color appearance transformation 1010 and the linearization table 1030 as shown in FIG. 10.

Here, the color appearance transformation and table 1210 includes a color space transformation, a first pair of one-dimensional look up tables, a 3×3 matrix, a second pair of one-dimensional look up tables, a multi-dimensional look up table, a third pair of one-dimensional look up tables, and a second color space transformation. In this way, the profile step (1141) includes the data required for mapping the color image data into the device-independent color space, and for mapping the color image data from the device-independent color space.

It should be noted that the profile step (1141) does not necessarily use all the above described transformations and tables. For example, the input image data from the monitor is transformed from CIE XYZ space into CIE JCh space, using the first pair of one-dimensional look up tables followed by the 3×3 matrix, and the color space transformation, and other steps are not performed. On the contrary, on outputting the color image data to the monitor, the color space transformation for transforming from the JCh color space into the XYZ color space would be used, subsequently the 3×3 matrix would be used, and furthermore the second pair of one-dimensional look up tables would be used.

A transformation step bit field 1220 configures a mechanism for indicating which is specified and required among the above described elements by the profile step (1141).

FIG. 13 is a diagram for illustrating a structure of the gamut mapping step. The user can select which type of the GMA should be used at various points of time in the color transformation sequence 1130 which is created by the transformation sequence creation module 910. A gamut mapping step (1301) includes a pointer 1310 of the GMA for indicating the specific GMA 840 which is required by the user at the corresponding GMA reference in the GMA list 1120.

It should be noted that the GMA pointer 1310 may identify a specific type of GMA by use of another appropriate means such as identifying the GMA with its name. It can be seen that other gamut mapping step may also include the GMA pointer for indicating another type of GMA which is indicated by the user at the GMA references 1121 to 1122 included in the GMA list 1120. In this way, the user can control which type of GMA should be applied at a predetermined point of time in the color transformation sequence 1130.

The gamut mapping step (1301) further includes gamut mapping data 1320 including a data block which is required for the specific type of GMA indicated by the GMA pointer 1310, in order to execute the gamut mapping. The gamut mapping data 1320 is obtained from the color profiles 830, and preferably includes both an input color gamut boundary descriptor and an output color gamut boundary descriptor corresponding to the input device and an output device for which the gamut mapping step (1301) maps the color image data.

For example, one specific GMA has an initialization routine for setting up all information required by the specific GMA. This initialization data is preferably provided also for the gamut mapping data 1320. Since the input color gamut boundary descriptor and the output color gamut boundary descriptor 1330 exist, the efficiency of the gamut mapping step (1301) improves when the specific GMA is applied to the color image data.

FIG. 14 is a diagram for illustrating the transformation of the color image data using the color transformation sequence, at the system level. In FIG. 14, the input image data 810 is transformed by the color transformation sequence 1130. First, the first transformation step of the color transformation sequence 1130 is the profile step (1141), which transforms the input image data 810 from the device-dependent color space corresponding to the input device such as the RGB, to the device-independent color space such as the JCh.

Next, the GMA step (1142) is applied to the input image data 810, and the input image data 810 is gamut mapped into the indicated color gamut boundary. The GMA step (1142) utilizes the GMAs 840 provided from the color management module 801. The GMAs 840 utilize the color gamut boundary descriptors of an input color space and an output color space, in order to execute the gamut mapping correctly.

The profile step (1143) transforms the input image data 810 from the device-independent color space such as the JCh to the device-dependent color space corresponding to the output device such as the RGB, and generates the output image data 820.

FIG. 15 is a flowchart showing a color transformation process of the color image data. First, the color transformation module 920 of the application programming interface (API) in the color management module 801 is invoked (S1501). Here, a transformation pointer for indicating an applicable color transformation sequence by the user is provided together with the input image data. Then the first transformation step in the color transformation sequence reads (S1502), and determines whether or not the transformation step is the profile step (S1503). Here, if the transformation step is the profile step, the color appearance transformation and table is accessed from that profile step (S1504).

Next, the transformation step bit field is accessed from the profile step and decoded, and it is determined which transformation and table should be utilized in this specific profile step, such as a one-dimensional table included in the color appearance transformation and table (S1505). Next, according to the determination, an appropriate transformation is applied to the input image data (S1506).

Moreover, at step S1503, if it is determined that the transformation step is the GMA step, the GMA pointer as well as the input color gamut boundary descriptor and the output color gamut boundary descriptor are accessed from the GMA step (S1507).

As described above, the GMA pointer is utilized in order to access the appropriate GMA to be applied to the input image data. Conventionally in the appropriate GMA, values which have been previously designated by the user are held in the intermediate data and attribute information.

Next, the appropriate GMA is applied to the input image data, using the color gamut boundary descriptor (S1508). Then it is determined whether or not the transformation step to be processed remains in the color transformation sequence (S1509) Here, if the transformation step to be processed remains, the process returns to S1502. While the transformation step to be processed exists, the process repeats S1502 to S1509. If no transformation step exists, this process is terminated.

In this way, the user can control selection of available GMA through the color transformation sequence. And the user can perform a highly accurate color reproduction by performing a flexible gamut mapping, which utilizes the color gamut boundary descriptors of the input color space and the output color space at the point of time when the gamut mapping is executed.

The above described print process is assumed to output to an existing PDL (Page Description language) such as PCL, PostSCript and the like.

On the other hand, a graphic format with a high regard for the display of a graphic design to the monitor, such as SVG, has been used. The SVG, which is an abbreviation of Scalable Vector Graphic, is a standard for describing a two-dimensional graphic in an XML format. Moreover, the SVG is a drawing method for dealing with graphics as numerical data for representing lines or curves, instead of as a collection of dots, and stores the image as coordinates of the lines and a collection of angles and directions. For that purpose, the drawn graphics may be freely processed such as movement, inversion, enlargement, reduction and the like, and also have small data capacity.

In the SVG, there are three types of objects: an image, a vector graphic and a text. The SVG is an advanced application, and it is possible to use the SVG to utilize rich and graphical functions. As representative of the functions, an $\alpha$ blending and a gradation are cited.

The $\alpha$ blending is a technique which is also known as a translucent copy. This process performs an operation by adding two color values in the color space in which the rendering is performed, depending on an a value (opacity). Assuming that a basic expression has the RGB as an $\alpha$ blending result, RGB1 as a transferring RGB, RGB2 as a transferred RGB, and an $\alpha$ as the $\alpha$ value (0.0-1.0) results in the following expression:

$$RGB=RGB1*\alpha+RGB2*(1-\alpha).$$

On the other hand, the gradation performs an operation in which a linear interpolation is discretely performed between the two color values in the color space in which the rendering is performed.

The following processes are performed in a case where a web designer performs a web design on the monitor using the $\alpha$ blending function of the above described SVG. First, the $\alpha$ blending function is implemented in a rendering color space (for example, a RGB color space such as the sRGB) specified in an operating system (OS), and then the RGB data of that rendering color space would be color-matching transformed into monitor RGB to be displayed.

In other words, after the process of $\alpha$ blending is performed in a device-independent rendering color space (SRGB), the data is transformed into a monitor RGB color space which is the device color space.

However, in the color matching by means of the above described conventional ICC profile as described above, since it is not possible to perform the matching based on color space information of the input device, and the process is to be uniformly performed even if input color data comes from the device of whatever color gamut (the input color data is transformed into Jch or L*a*b* of CIE and the color matching is performed), there has been a limit in improving color matching accuracy.

Moreover, on applying the color matching by means of the ICC profile to the PDL data and outputting it to the printer, as shown in FIG. 16, rendering processing of the $\alpha$ blending 1602 is generally performed by performing gamut mapping 1601 (first processing) to the color gamut of the output device and then by performing processing (second processing) for obtaining color after the $\alpha$ blending. However, it is not easy to replace $\alpha$ blending data of application software by $\alpha$ blending function of PDL because of data structure in comparison with SVG, whether the PDL has $\alpha$ blending function or not. It should be noted that it is easy to look for $\alpha$ blending objects because the SVG is described by XML and is structured data (tree structure and tag). Therefore, utilizing the $\alpha$ blending function of PDL was less than the SVG. Accordingly, it does not become something of a problem because performing the first processing and the second processing is not the rule.

However, in the case where the $\alpha$ blending function is more commonly used for web design, such as the above described SVG, if the gamut mapping is performed before the rendering, a problem occurs in which appearance would be different between the monitor display and the printer output at a portion of the $\alpha$ blending.

SUMMARY OF THE INVENTION

The present invention is made in order to solve the above described problems, and it is an object of the present invention to realize preferred color reproducibility when a rendering and color space compression (gamut mapping) are performed for objects described by a description language.

In order to attain the above described object, according to an embodiment of the present invention, an image processing apparatus comprising: rendering means for performing a rendering of objects described by description language into bitmap data; and color space compression means for performing, in a color reproduction range, color space compression of the bitmap data in which the rendering has been performed is provided.

Moreover, according to an embodiment of the present invention, an image processing method comprising: a rendering step of performing a rendering of objects described by description language into bitmap data; and a color space compression step of performing, in a color reproduction range, color space compression of the bitmap data in which the rendering has been performed is provided.

Other objects of the present invention will be apparent with the following drawings and a detailed description described below.

BRIEF DESCRIPTION OF THE DRAWINGS

FIG. 16 is a diagram showing a conventional gamut mapping 1601 and a rendering of an α blending 1602;

DETAILED DESCRIPTION OF THE PREFERRED EMBODIMENTS

Hereinafter, the best embodiment for practicing the present invention will be described in detail with reference to the drawings.

Figure 1A:
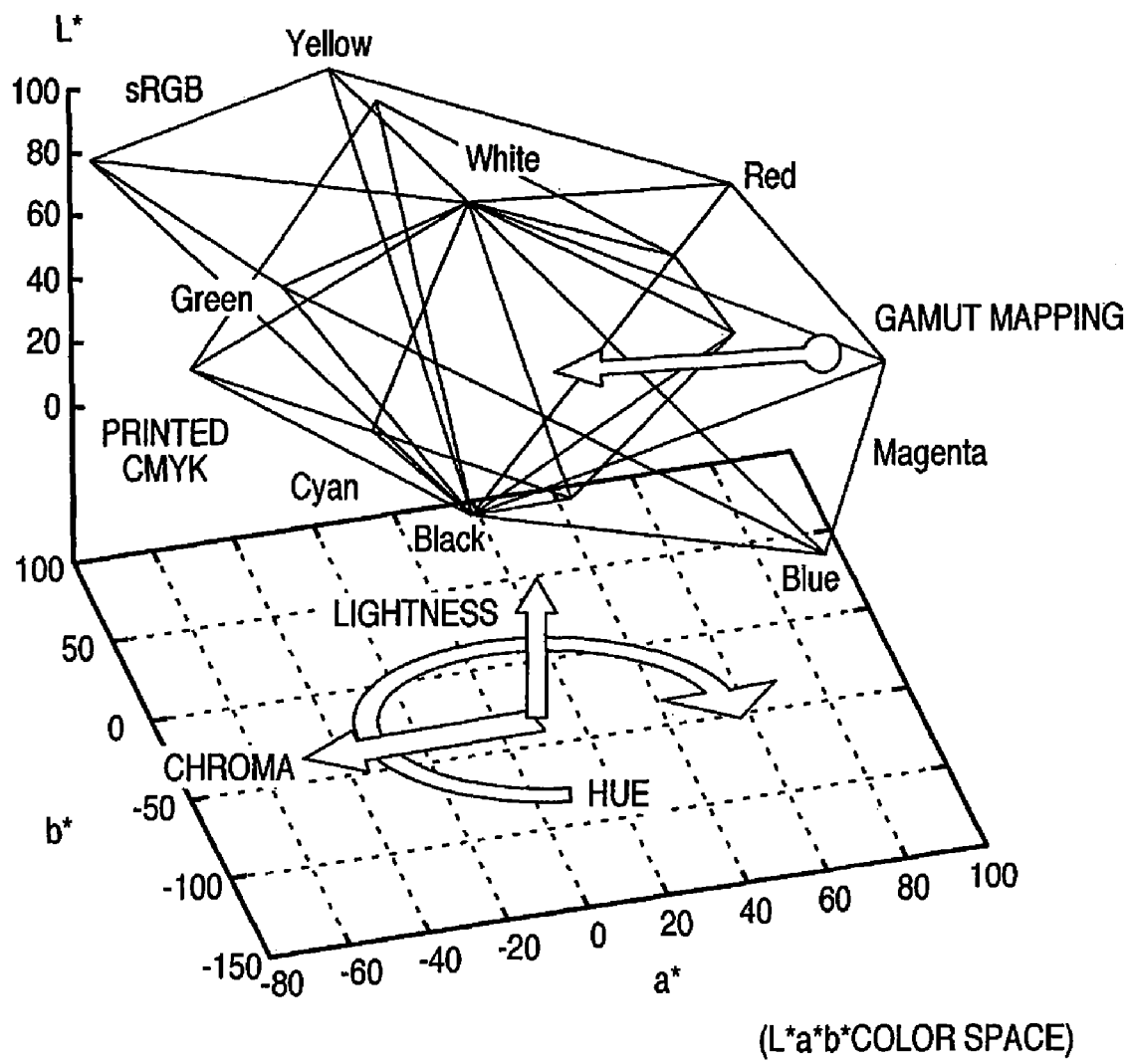
FIG. 1A is a diagram showing difference of color gamuts between sRGB and printed CMYK.
Figure 1B:
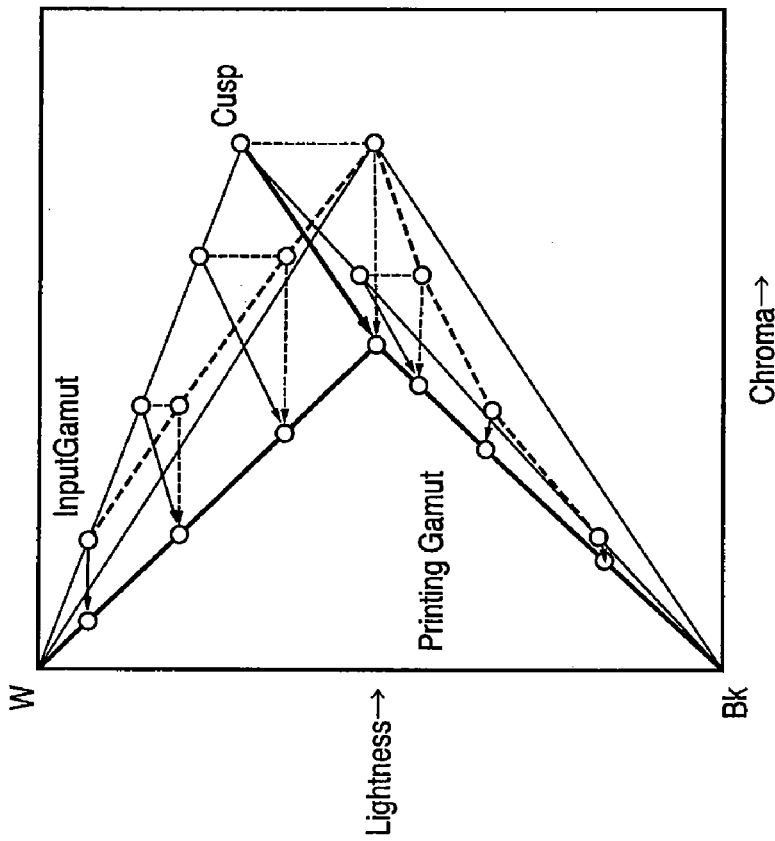
FIG. 1B is a method for mapping of a color reproduction in a state where a chroma is maintained.
Figure 1C:
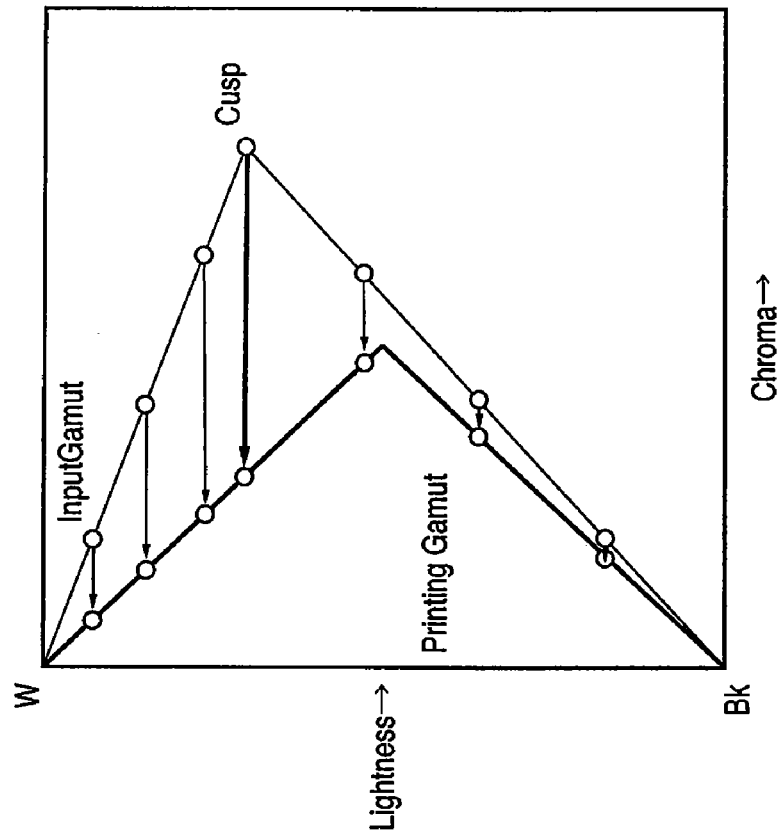
FIG. 1C is a method for mapping of the color reproduction with a brightness being maintained.
Figure 2:
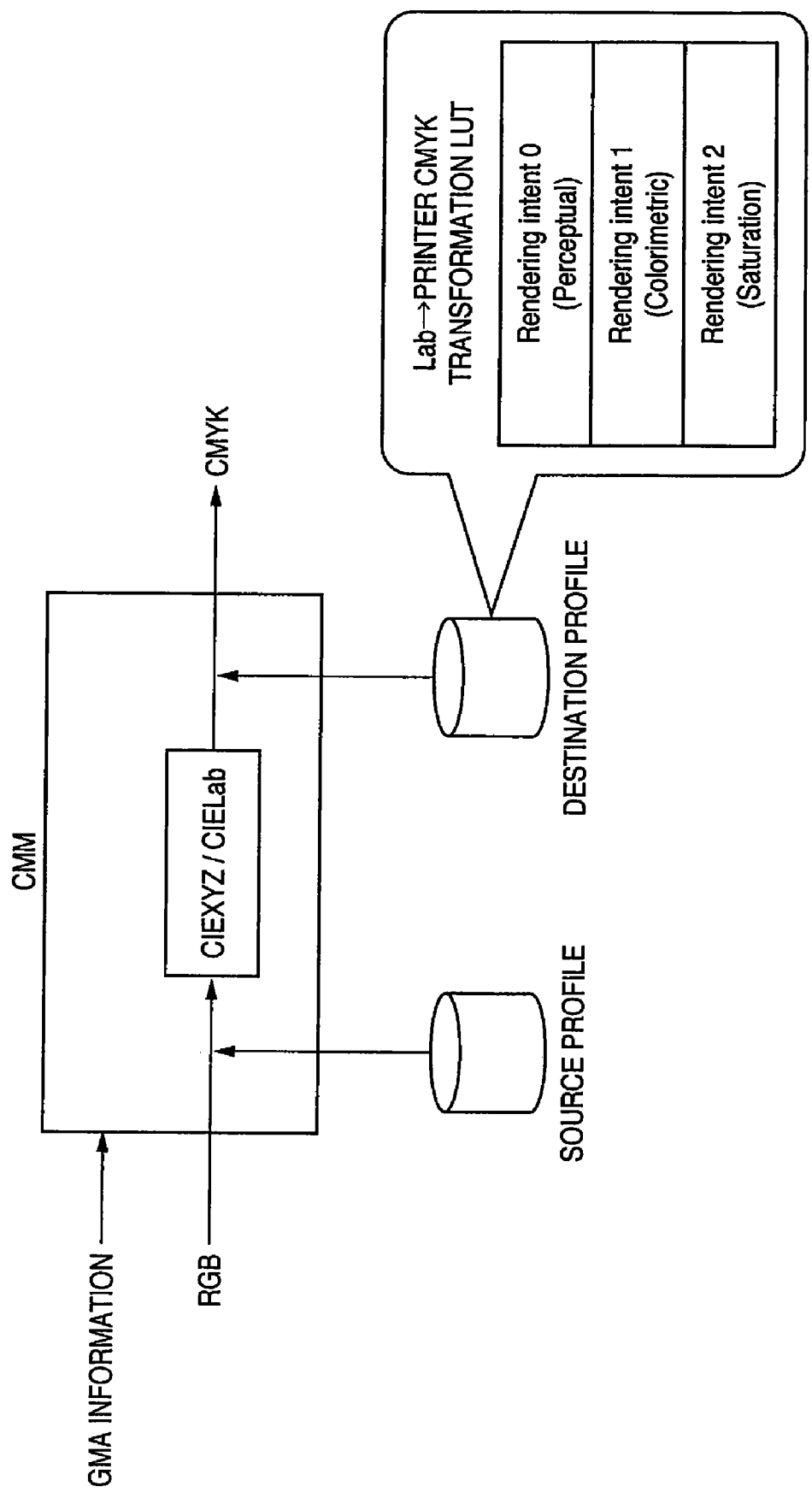
FIG. 2 is a diagram showing a flow of a general color matching process using an ICC profile.
Figure 3:
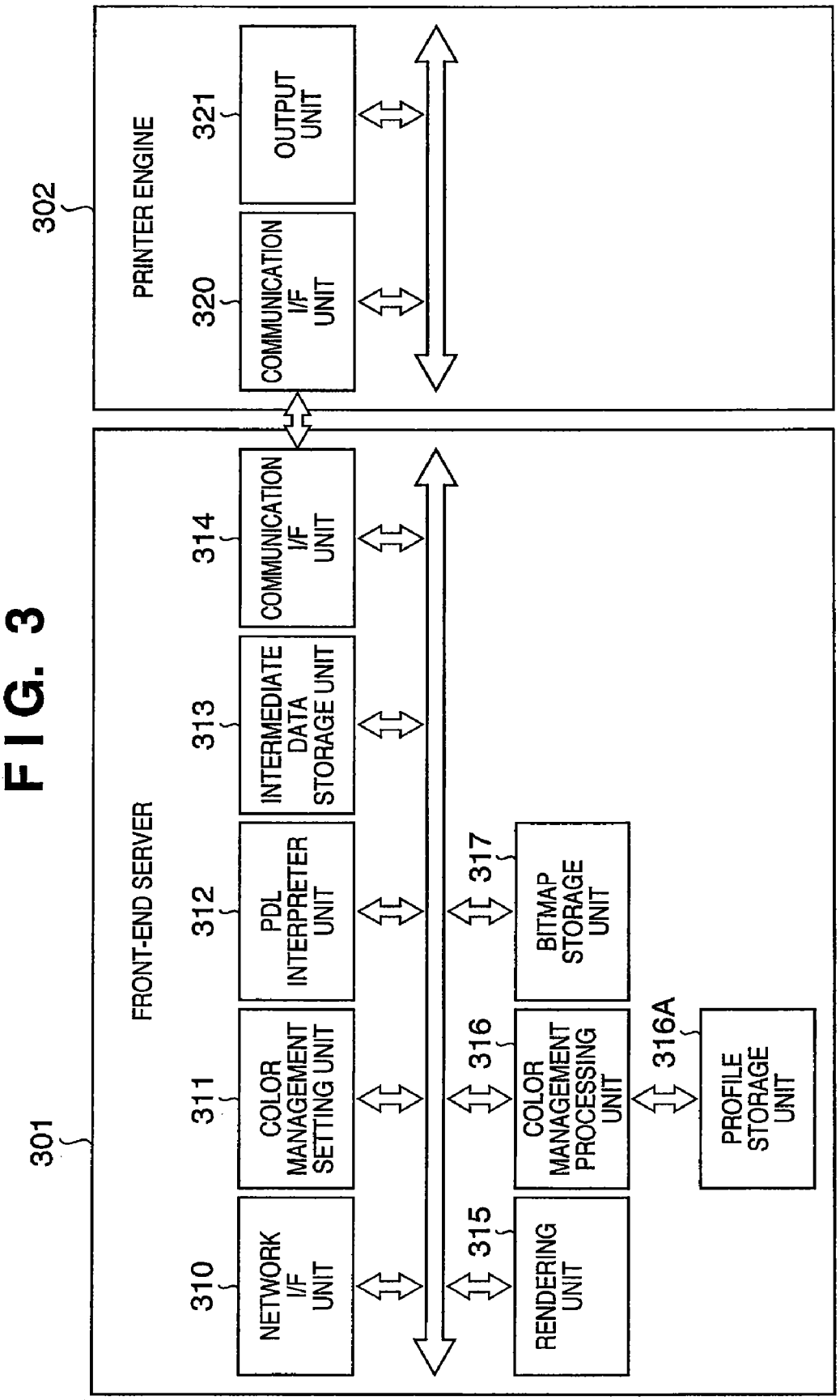
FIG. 3 is a block diagram showing configurations of a front-end server 301 as a controller of a conventional printer, and a printer engine 302.
Figure 4:
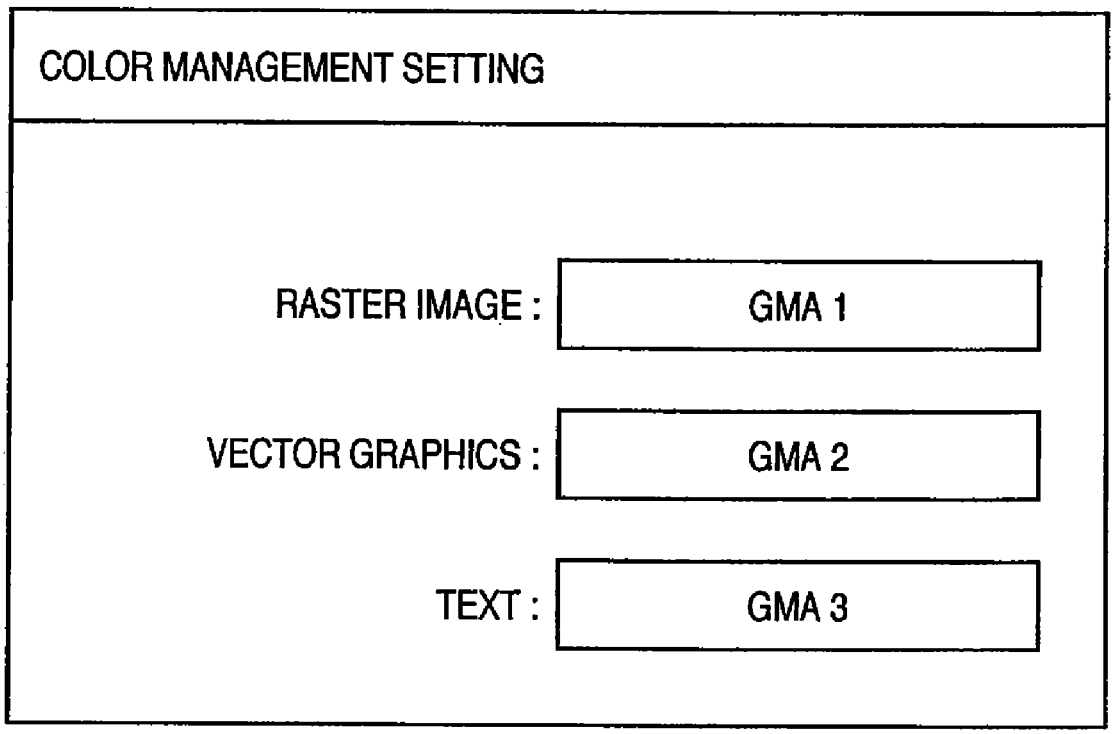
FIG. 4 is a diagram showing an example of a GUI for realizing a color management setting unit 311.
Figure 5:
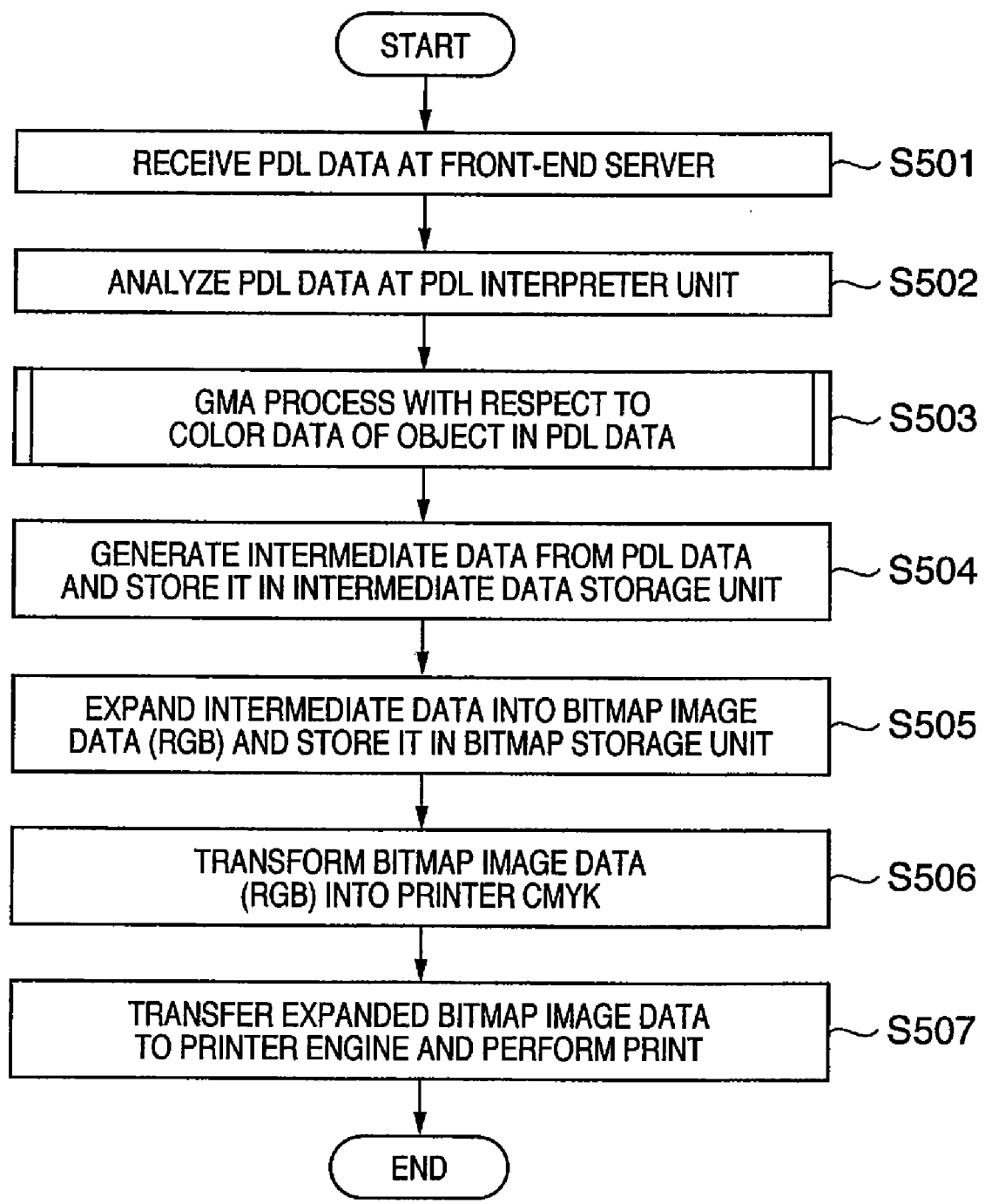
FIG. 5 is a flowchart showing a print process using the conventional front-end server 301 and the printer engine 302.
Figure 6:
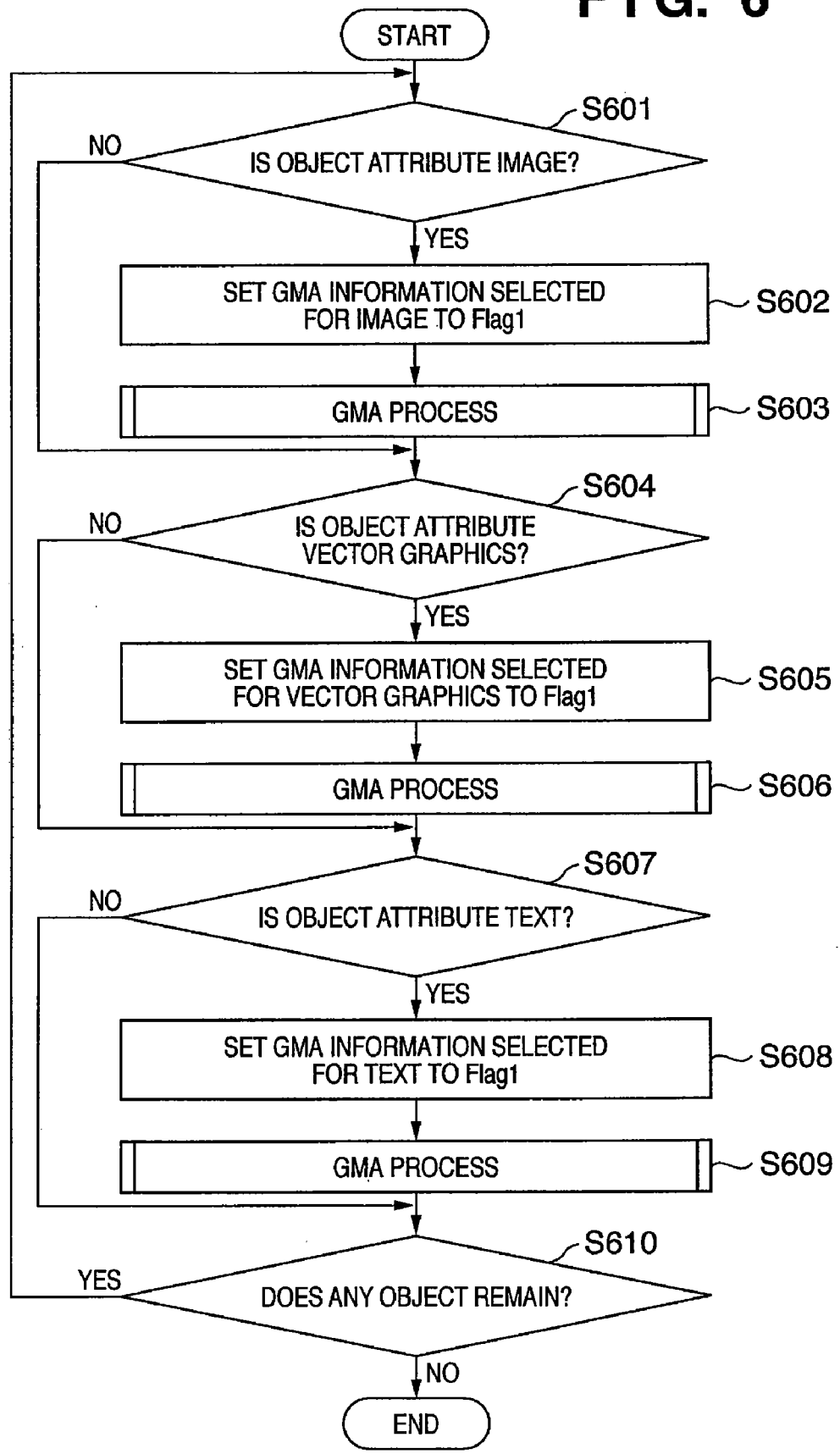
FIG. 6 is a flowchart showing details of a GMA process with respect to color data of an object in PDL data.
Figure 7:
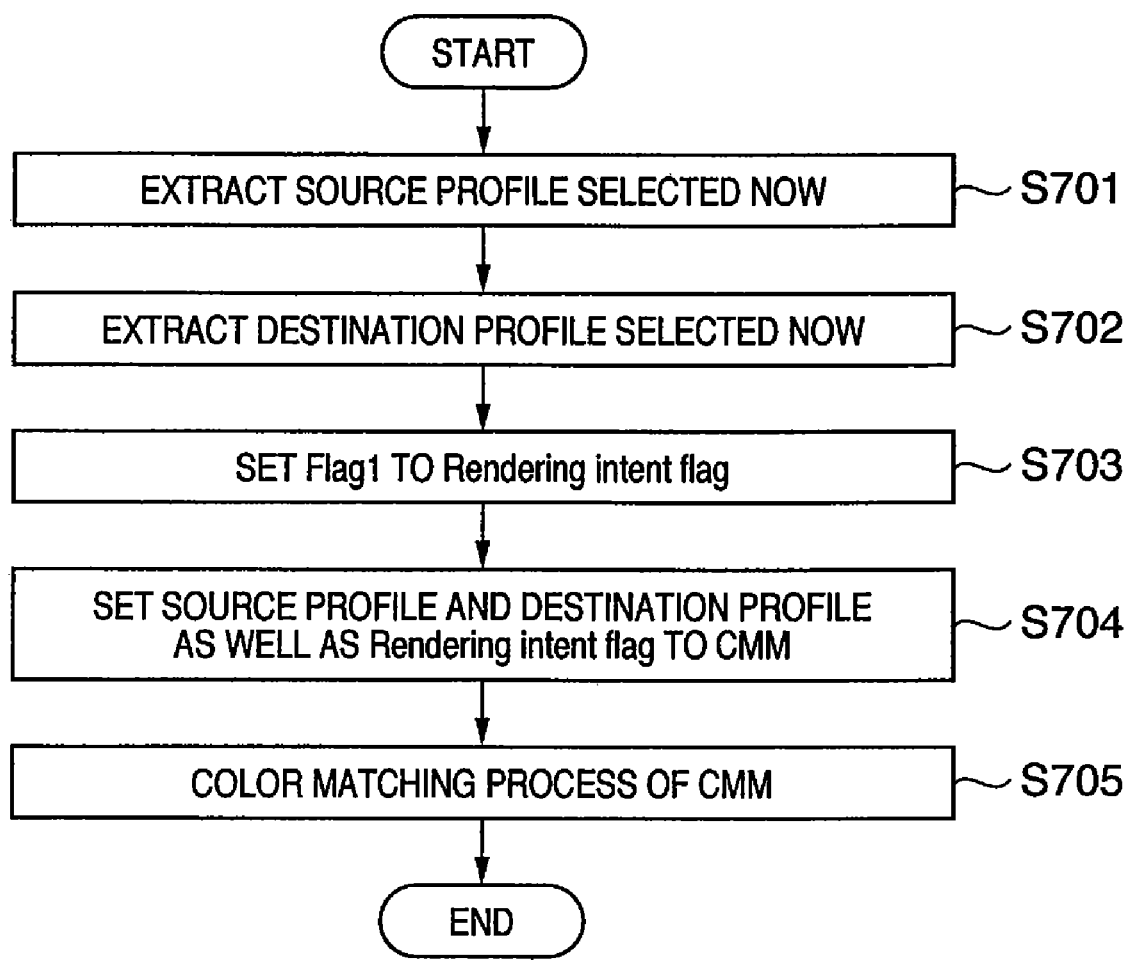
FIG. 7 is a flowchart showing the details of the GMA process.
Figure 8:
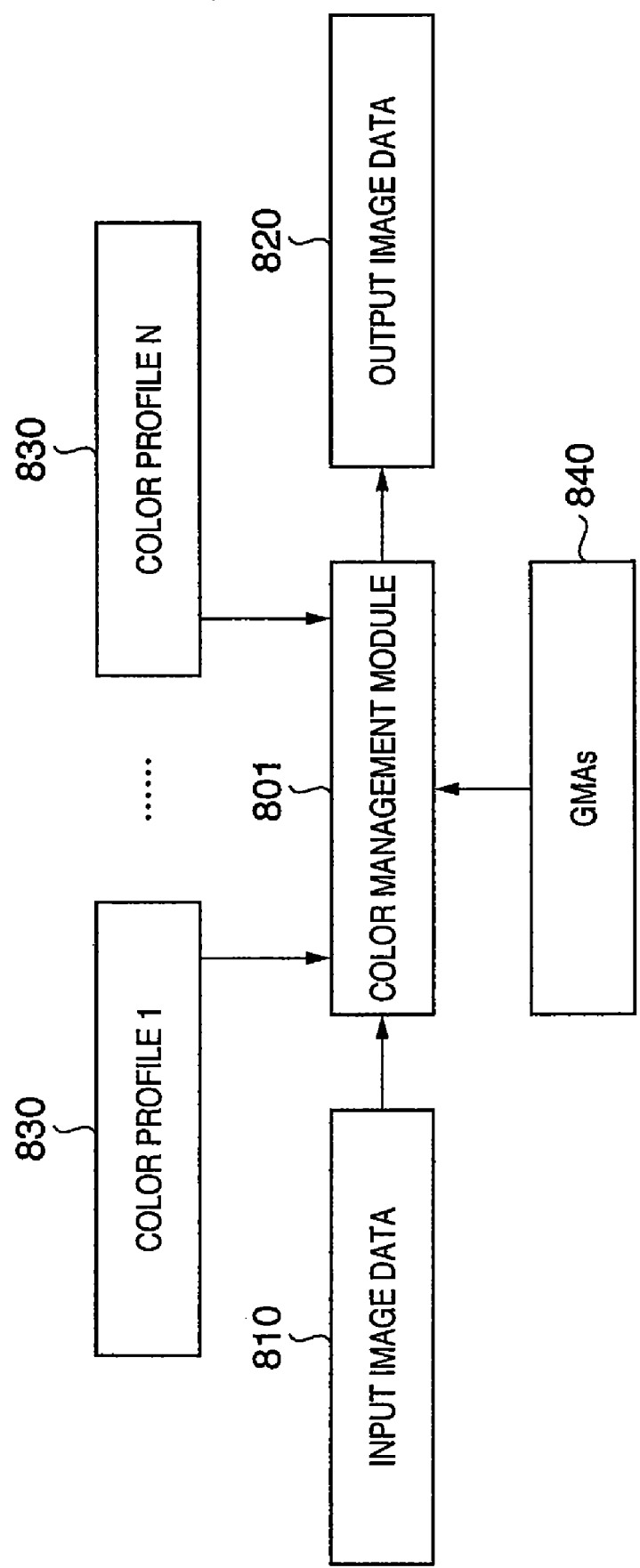
FIG. 8 is a diagram for illustrating a color management module at a system level.
Figure 9:
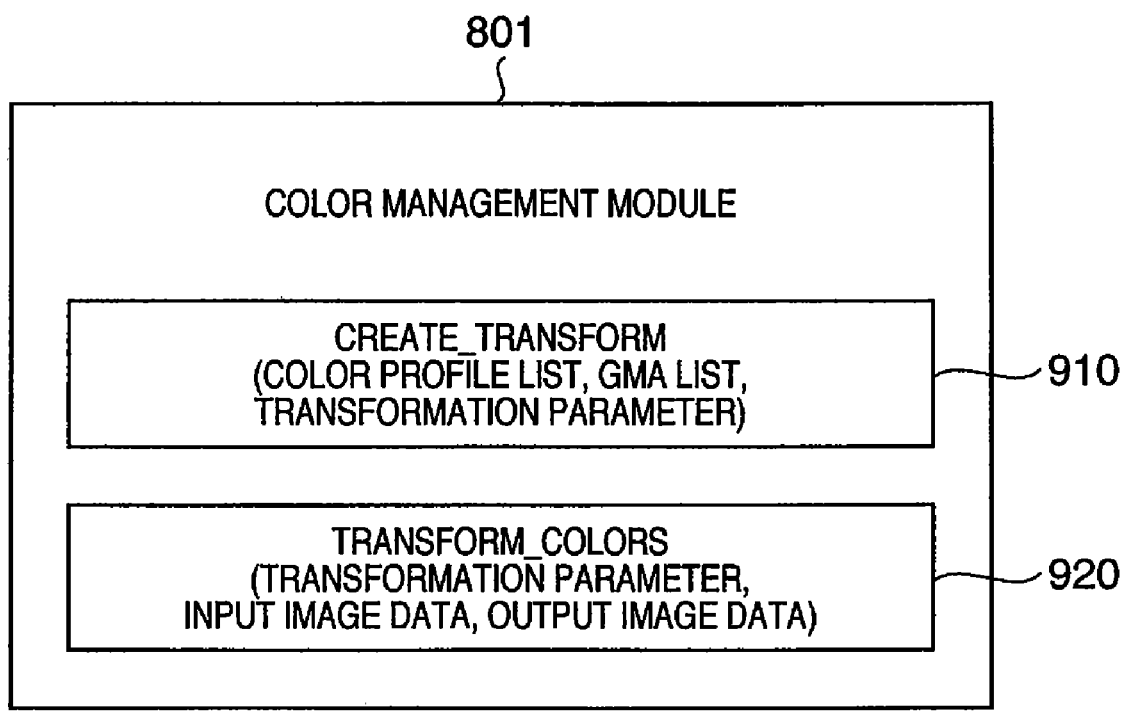
FIG. 9 is a diagram showing components of a color management module 801.
Figure 10:
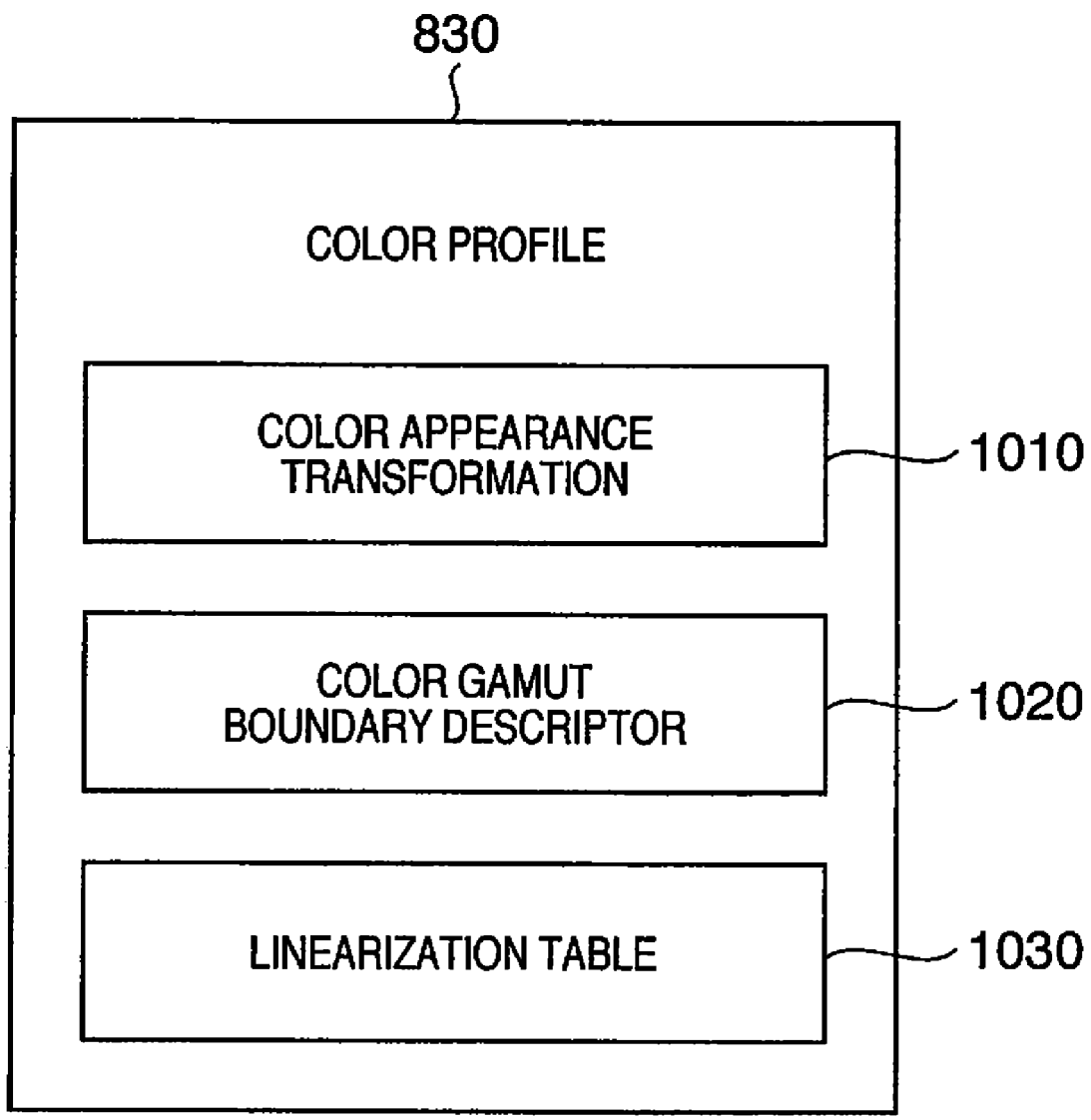
FIG. 10 is a diagram for illustrating a structure of a color profile 830.
Figure 11:
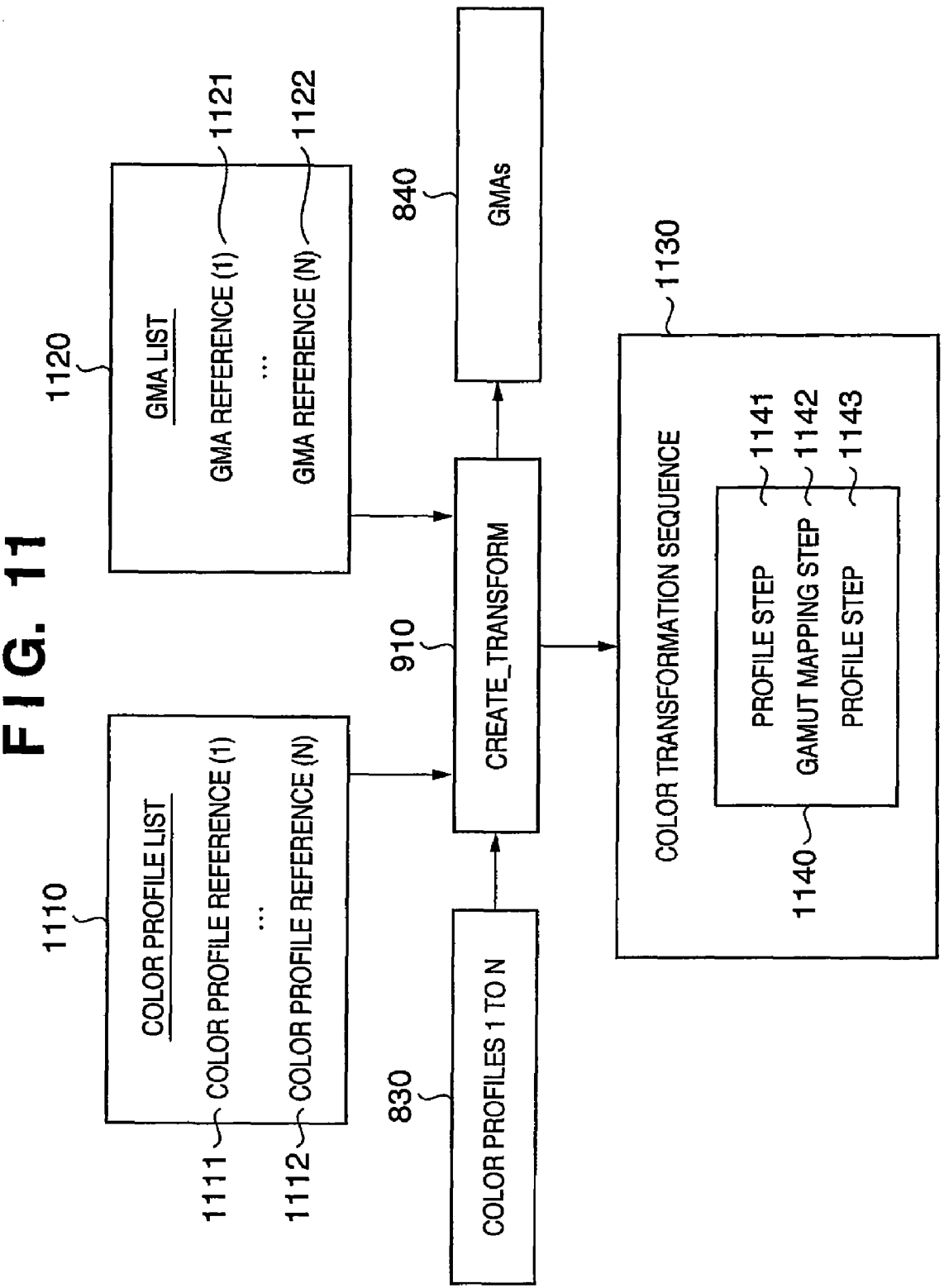
FIG. 11 is a diagram for illustrating a color transformation sequence creation at the system level.
Figure 12:
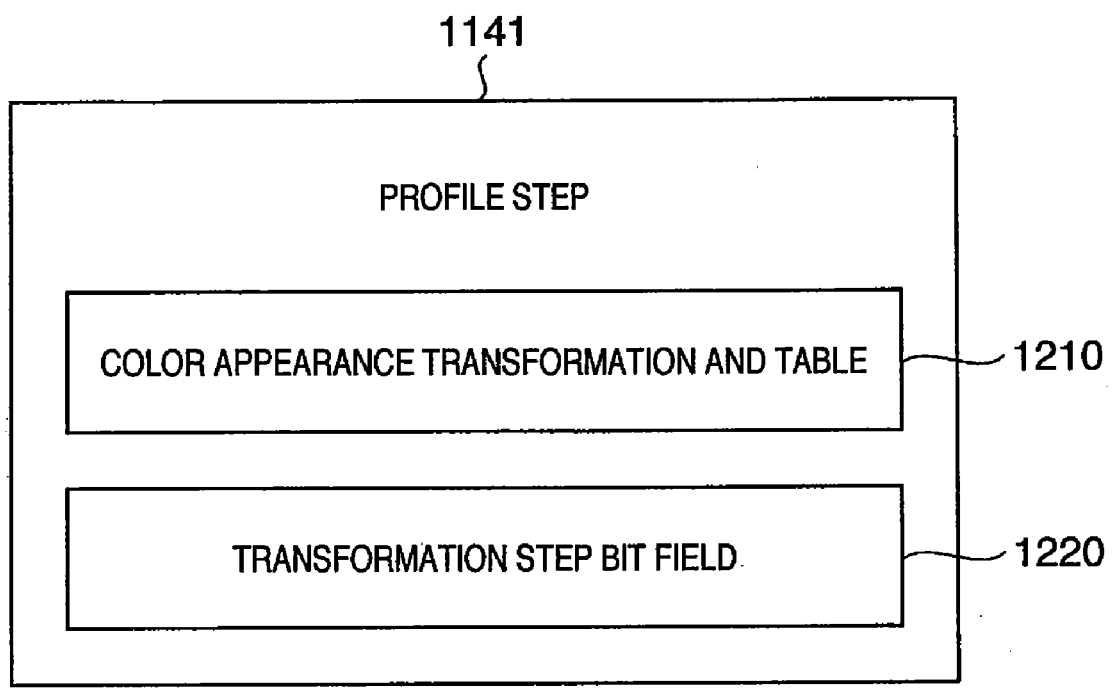
FIG. 12 is a diagram for illustrating a structure of a profile step.
Figure 13:
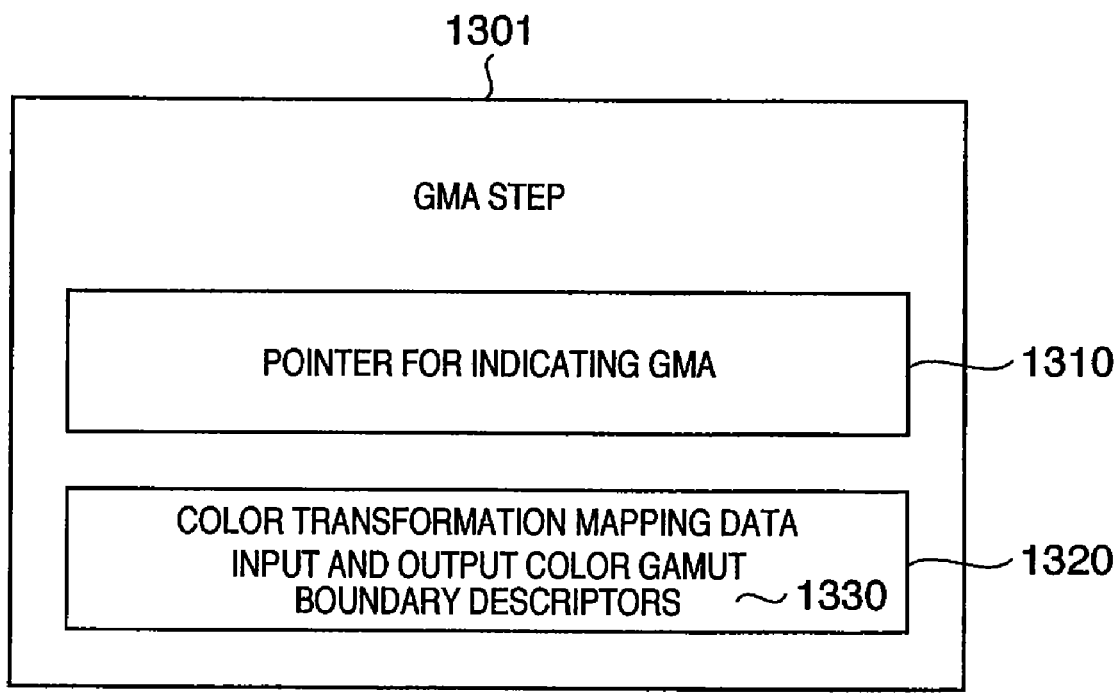
FIG. 13 is a diagram for illustrating a structure of a gamut mapping step.
Figure 14:
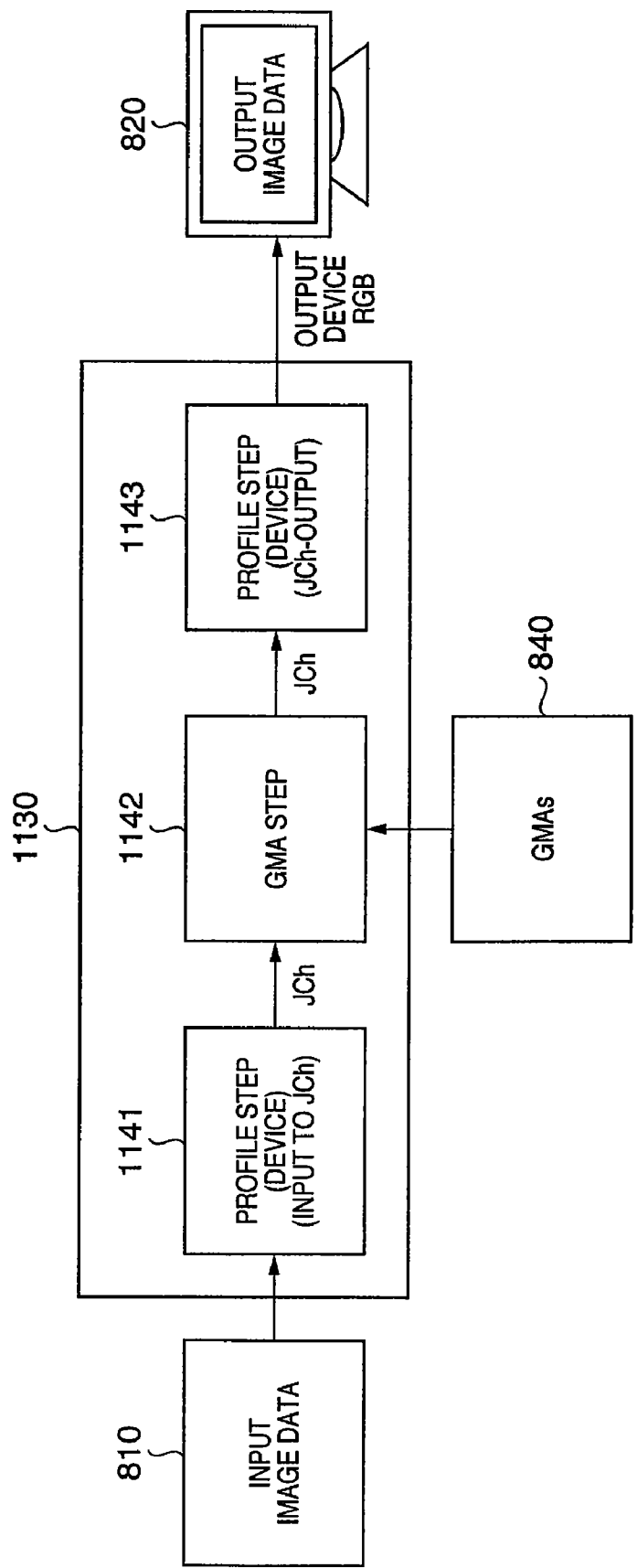
FIG. 14 is a diagram for illustrating a transformation of a color image data using a color transformation sequence, at the system level.
Figure 15:
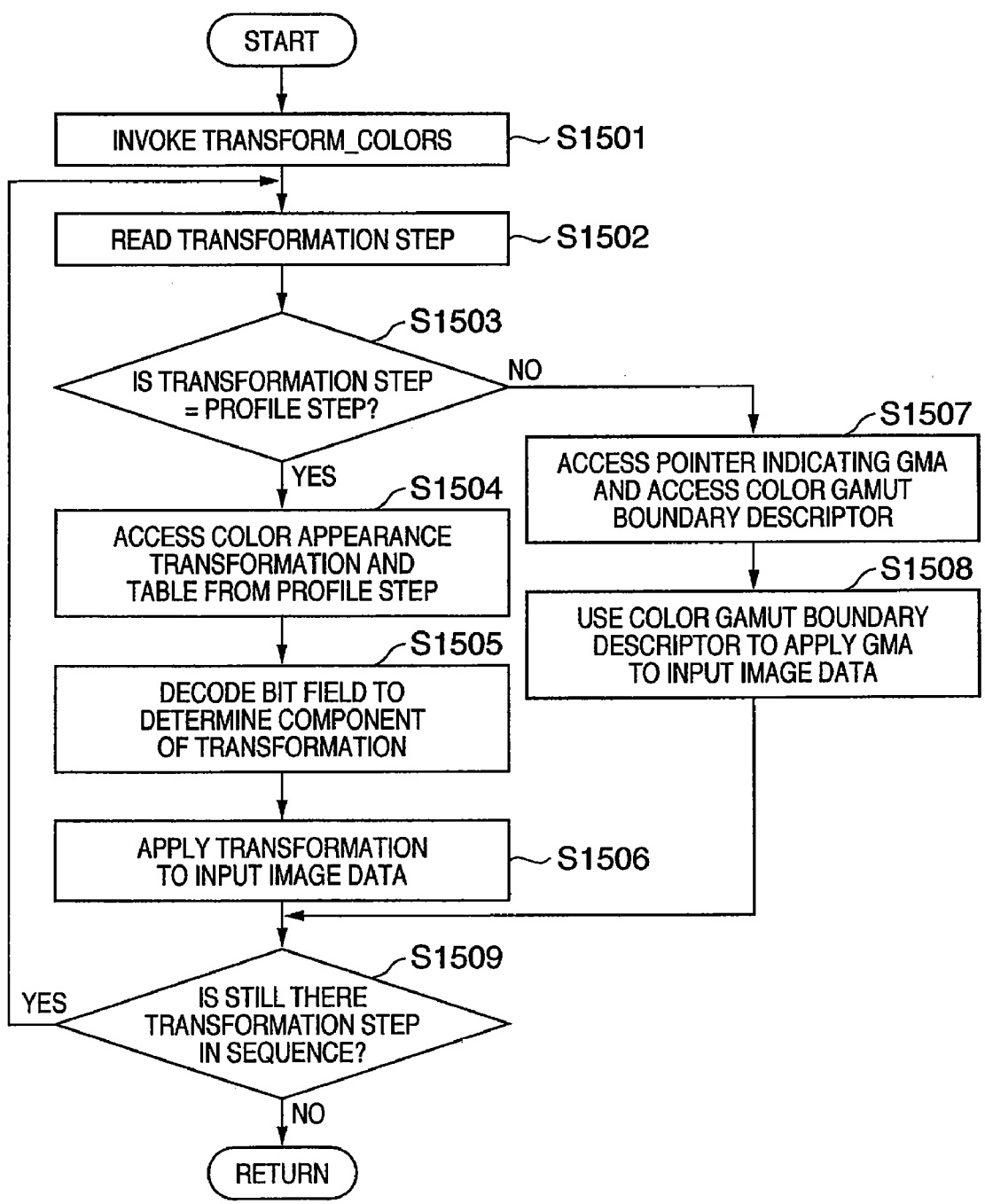
FIG. 15 is a flowchart showing a color transformation process of the color image data.
Figure 17:
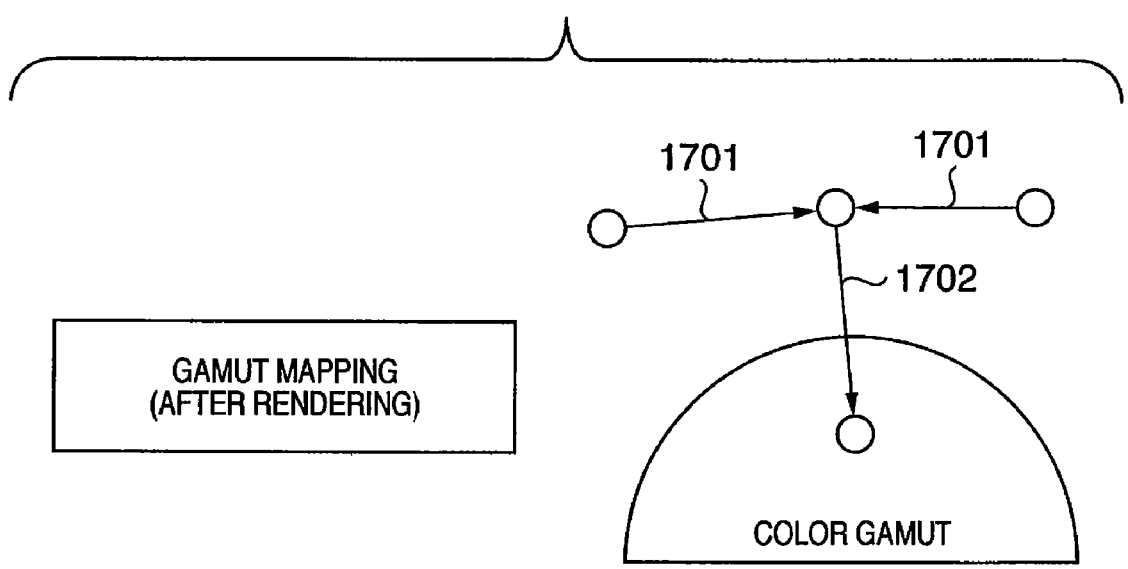
FIG. 17 is a diagram showing a rendering of an α blending 1701 and a gamut mapping 1702 in an embodiment.

It should be noted that, in the embodiment, a new color matching process is incorporated in a print process instead of a color matching process by means of an ICC profile. As shown in FIG. 17, a new print mechanism will be described, in which a rendering of an α blending 1701 is performed in a color gamut (rendering color reproduction range) broader than a color reproduction range of a printer, and subsequently color gamut is compressed 1702 into a color gamut of an output device.

<Configuration Diagrams>

Figure 18:
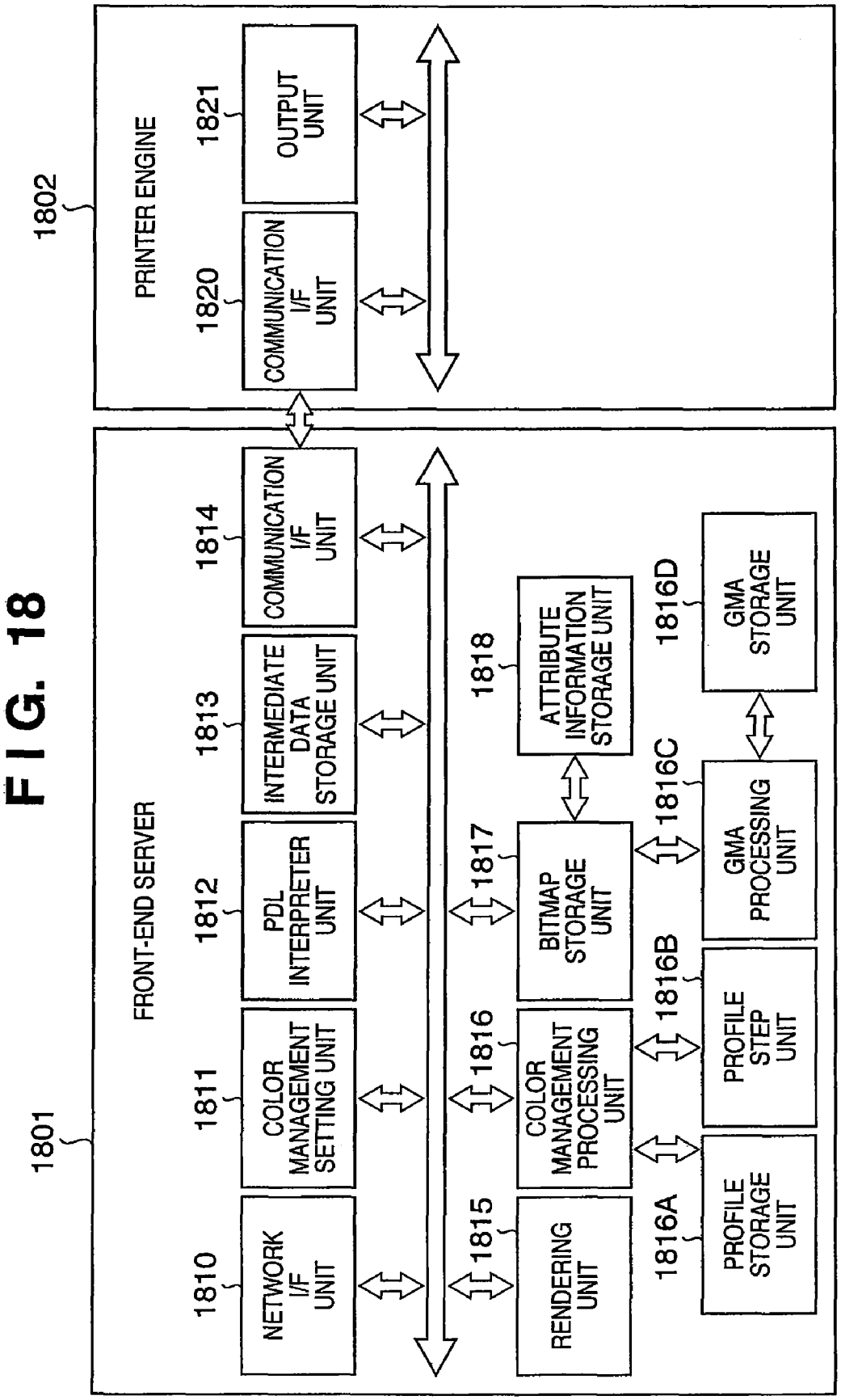
FIG. 18 is a block diagram showing configurations of a front-end server 1801 as a controller of a printer, and a printer engine 1802, according to this embodiment.

FIG. 18 is a block diagram showing configurations of a front-end server 1801 as a controller of a printer, and a printer engine 1802, according to this embodiment. As shown in FIG. 18, the front-end server 1801 as the controller of the printer is configured with a network I/F (interface) unit 1810 for connecting to a network, a color management setting unit 1811 for presetting a color management to be used by a user, a PDL interpreter unit 1812 for analyzing PDL (page description language) comprised of a plurality of objects input via the network to generate intermediate data, an intermediate data storage unit 1813 for storing the intermediate data generated at the PDL interpreter unit 1812, a communication interface unit 1814 for exchanging data with the printer engine 1802, a rendering unit 1815 for transforming the intermediate data in the intermediate data storage unit 1813 into bitmap image data, a color management processing unit 1816 for performing a color matching process set at the color management setting unit 1811, a profile storage unit 1816A for storing a profile to be used for the color matching, a profile step unit 1816B, a GMA processing unit 1816C, a GMA storage unit 1816D, a bitmap storage unit 1817 for storing expanded bitmap image data, an attribute information storage unit 1818 for storing attachment information which is created on expanding into the bitmap. It should be noted that the SVG (α blending and gradation command) is included in the PDL.

Moreover, the printer engine 1802 is configured with a communication I/F unit 1820 for exchanging the data with the front-end server 1801, and an output unit 1821 for performing the print.

Figure 19:
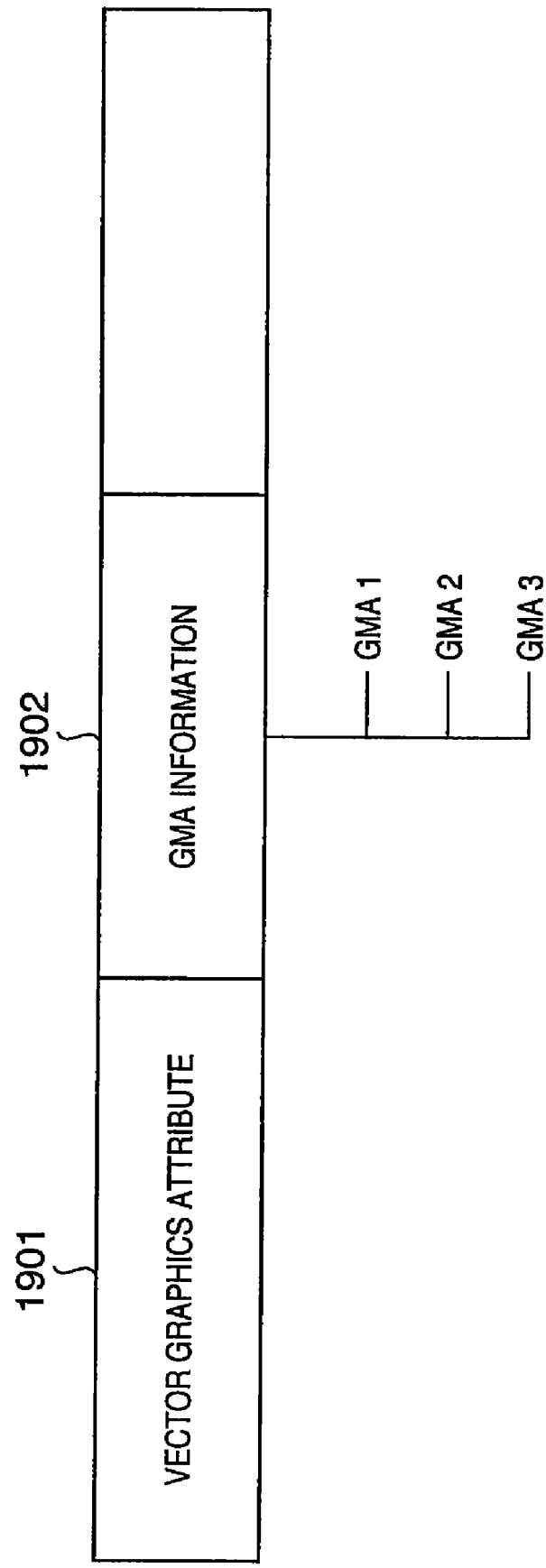
FIG. 19 is a diagram showing a configuration example of intermediate data to be stored in an intermediate data storage unit 1813.

FIG. 19 is a diagram showing a configuration example of the intermediate data to be stored in the intermediate data storage unit 1813. As shown in FIG. 19, the intermediate data is configured with attribute information 1901 (here, vector graphics object) which an object to be printed has, and GMA information 1902 which has been set at the color management setting unit 1811.

Figure 20:
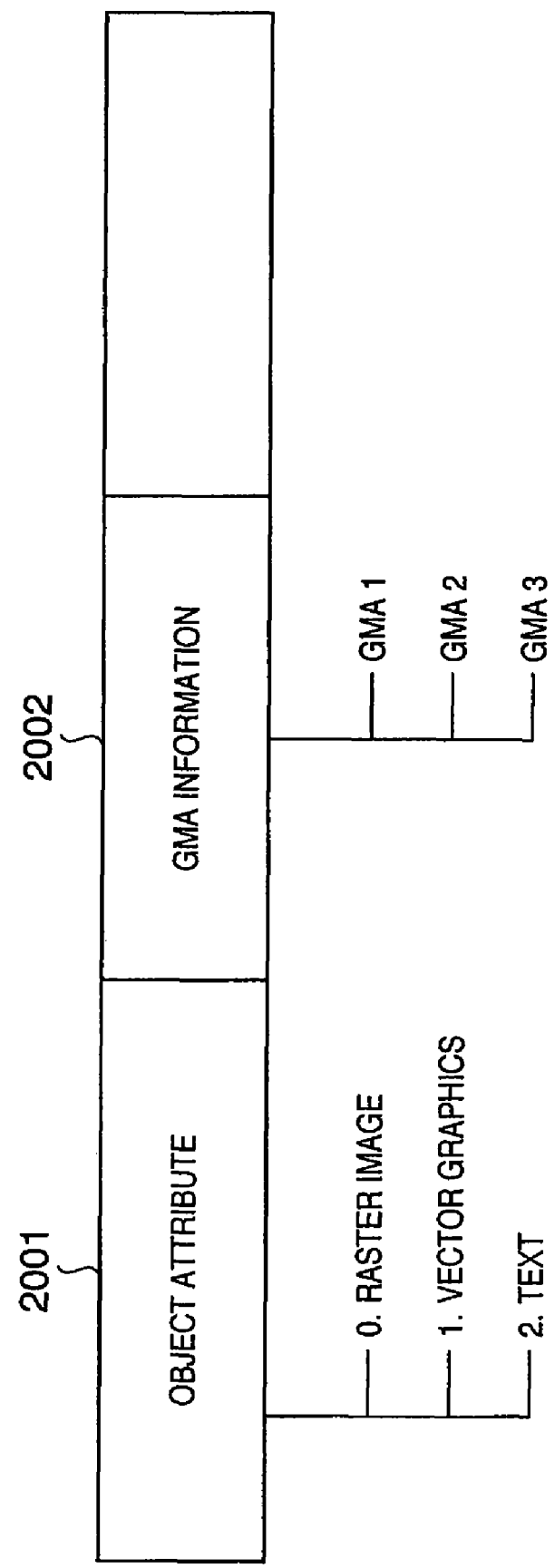
FIG. 20 is a diagram showing a configuration example of attachment information to be stored in an attribute information storage unit 1818.

FIG. 20 is a diagram showing a configuration example of the attachment information to be stored in the attribute information storage unit 1818. It should be noted that the attachment information is created for each pixel with respect to pixel data, when the color management processing unit 1816 expands the data into the bitmap image data. As shown in FIG. 20, the configuration of the attachment information is configured with an object attribute 2001 for indicating a type of the object, and GMA information 2002 which has been set at the color management setting unit 1811.

<Description of Flowcharts>

Figure 21:
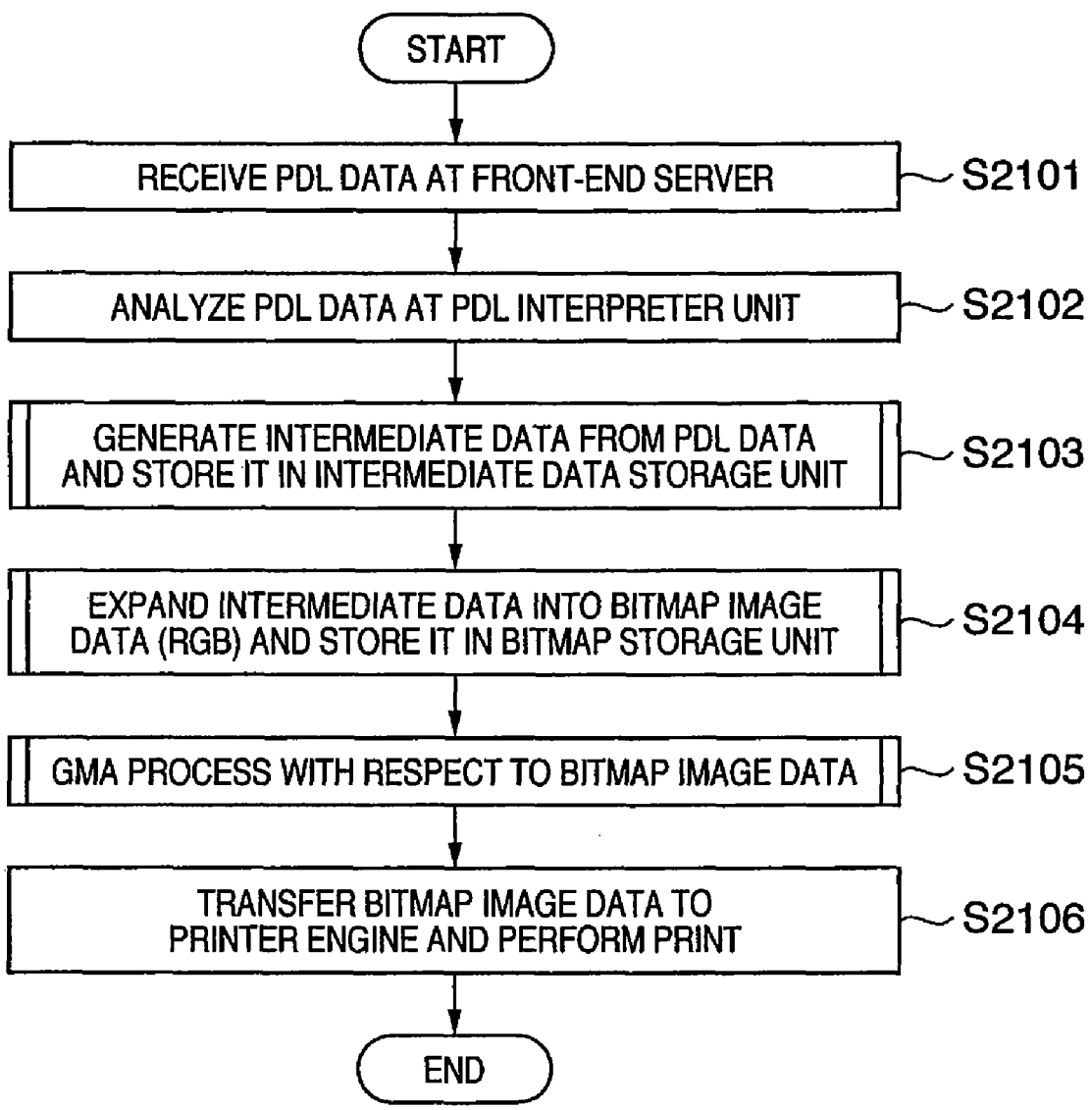
FIG. 21 is a flowchart showing an image output process using the front-end server 1801 and the printer engine 1802.

FIG. 21 is a flowchart showing an image output process using the front-end server 1801 and the printer engine 1802. First, when the front-end server 1801 receives PDL data via the network I/F unit 1810 (S2101), the PDL interpreter unit 1812 analyzes the PDL data (S2102). Then, the intermediate data is generated from the PDL data, and is stored in the intermediate data storage unit 1813 (S2103).

Next, the rendering unit 1815 expands the stored intermediate data into the bitmap image data, and stores the bitmap image data in the bitmap storage unit 1817 (S2104). Here, the color management processing unit 1816 performs a GMA process with respect to the stored bitmap image data (S2105). Finally, the expanded bitmap image data is transferred to the printer engine 1802, and the print is performed (S2106).

In the mechanism shown in FIG. 21, it is possible to introduce a mechanism for performing the GMA process after implementing an α blending function in a rendering color space.

Figure 22:
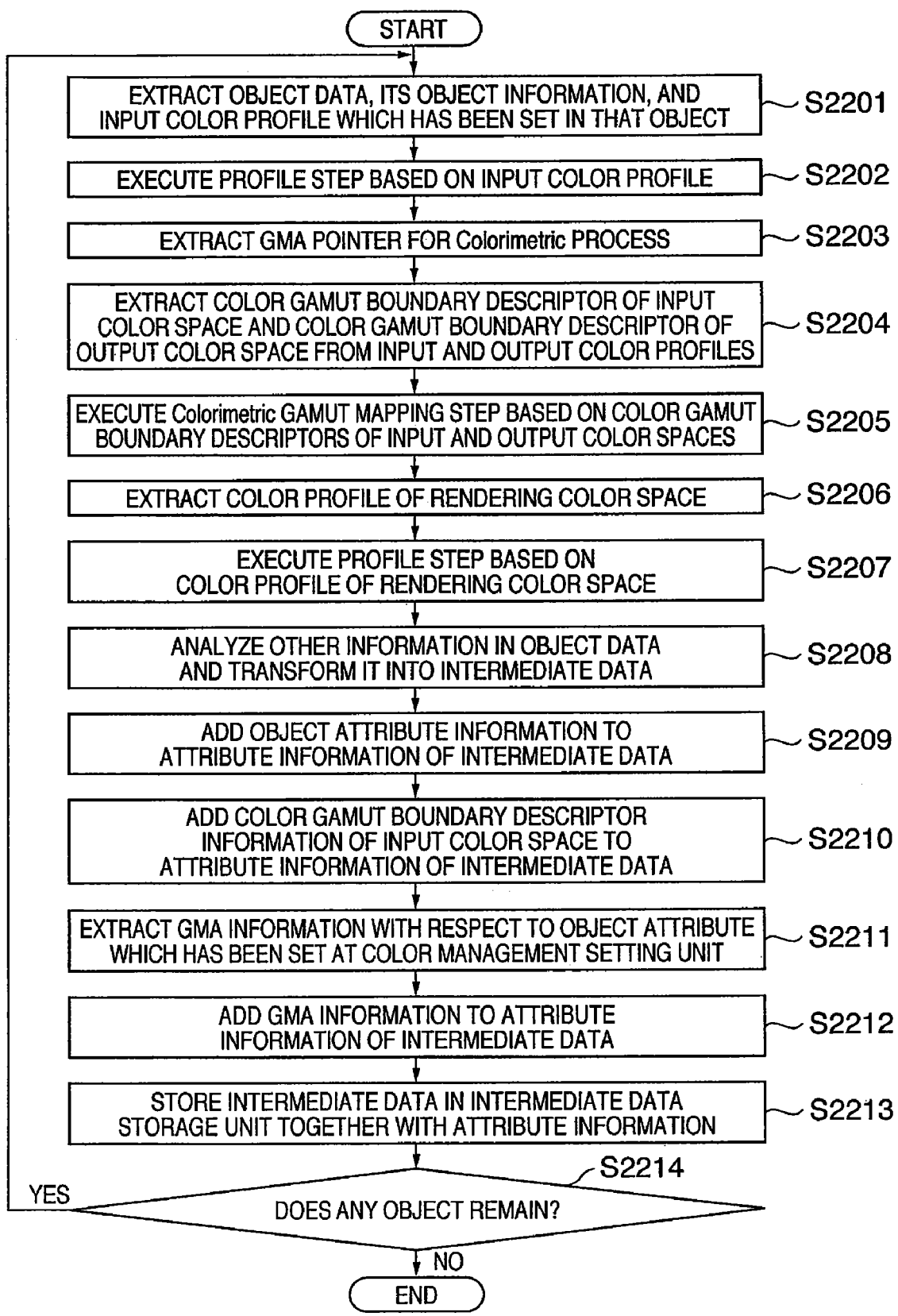
FIG. 22 is a flowchart showing a detailed process of S2103 shown in FIG. 21.

FIG. 22 is a flowchart showing a detailed process of S2103 shown in FIG. 21. First, object data is extracted from the PDL data, and object information and an input color profile which has been set in the object are acquired (S2201). Then a profile step is executed based on the input color profile (S2202). Next, a GMA pointer for a Colorimetric process is extracted (S2203). Then a color gamut boundary descriptor of an input color space and a color gamut boundary descriptor of an output color space are extracted from input and output color profiles (S2204).

Next, based on the color gamut boundary descriptors of the input and output color spaces, a Colorimetric gamut mapping step is executed (S2205). Next, a color profile of the rendering color space is extracted (S2206), and the profile step is executed based on the color profile of the rendering color space (S2207). Then other information in the object data is analyzed and transformed into the intermediate data (S2208), and the object attribute information is added to the attribute information of the intermediate data (S2209).

Next, color gamut boundary descriptor information of the input color space is added to the attribute information of the intermediate data (S2210). Then the GMA information with respect to the object attribute, which has been set at the color management setting unit 1811, is extracted (S2211), and the GMA information is added to the attribute information of the intermediate data (S2212). Then the intermediate data is stored in the intermediate data storage unit 1813 together with the attribute information (S2213), and while the object to be processed exists (YES at S2214), the process of the above described S2201 to S2213 is repeated. Thereafter, when there is not any object (No at S2214), this process is terminated.

In this way, based on the color profile which has been set with respect to each object in a document and the color profile of the rendering color space, it is possible to perform a color-measuring color space transformation on color space data of the input into the rendering color space, and to set the object attribute, the color gamut boundary descriptor of the input color space, and the GMA information as the attribute information in the intermediate data.

Figure 23:
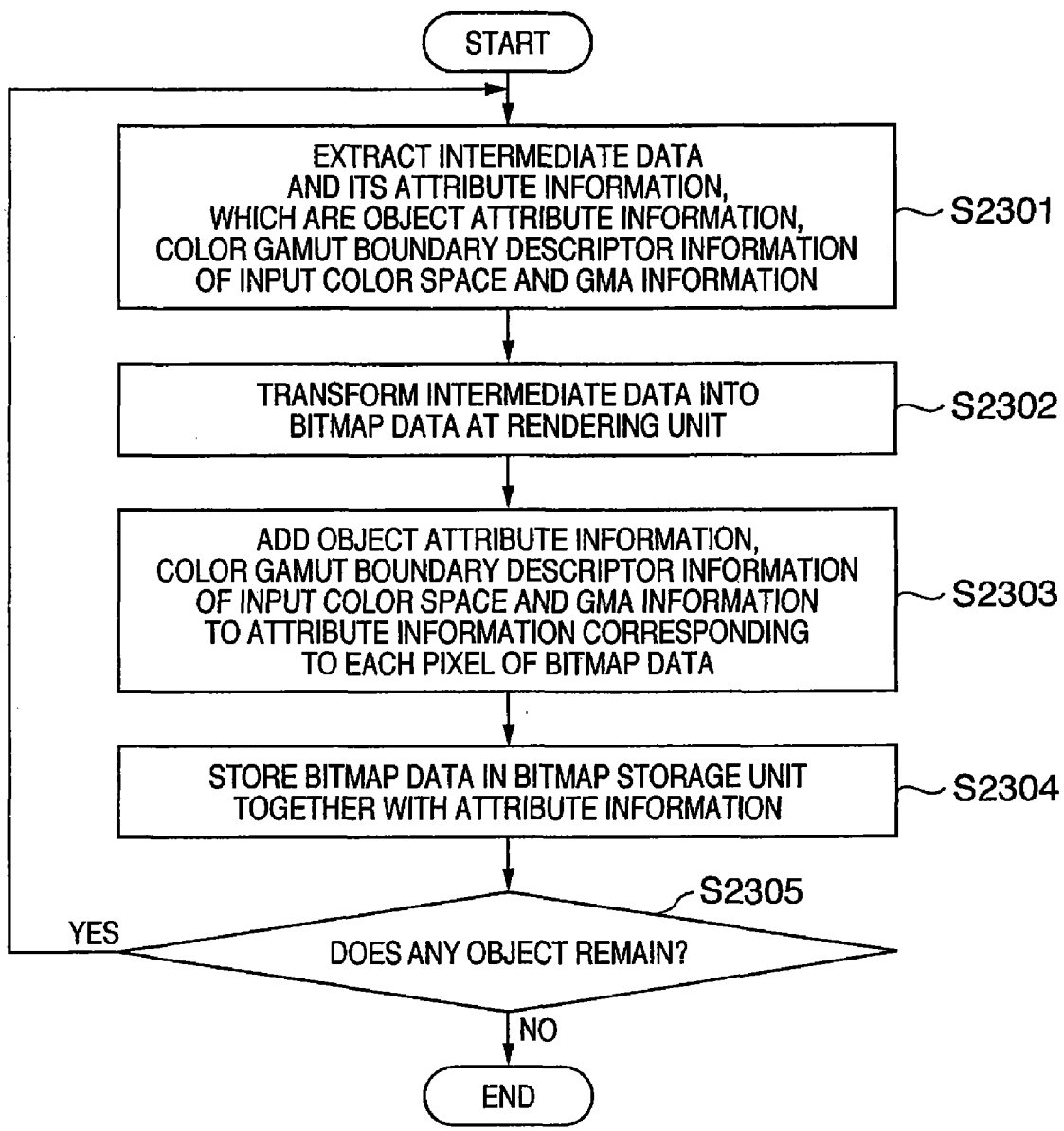
FIG. 23 is a flowchart showing a detailed process of S2104 shown in FIG. 21.

FIG. 23 is a flowchart showing a detailed process of S2104 shown in FIG. 21. First, the intermediate data and its attribute information, which are the object attribute information, the color gamut boundary descriptor information of the input color space and the GMA information, are extracted (S2301). Next, the intermediate data is transformed into the bitmap image data at the rendering unit 1815 (S2302). It should be noted that if objects of α blending are objects to be processed, a rendering of the objects is performed. This rendering color space is broader than a color reproduction range of a printer (printer color space). Next, the object attribute information, the color gamut boundary descriptor information of the input color space and the GMA information 1902 are added to the attribute information 1901 corresponding to each pixel of the bitmap image data (S2303). Then the bitmap image data is stored in the bitmap storage unit 1817 and attribute information storage unit 1818 together with the attribute information (S2304). While the object to be processed exists (YES at S2305), the process of the above described S2301 to S2304 is repeated. When there is not any object (No at S2305), this process is terminated.

In this way, it is possible to expand the intermediate data into the bitmap image data, and to set the object attribute, the color gamut boundary descriptor of the input color space, and the GMA information as the attribute information with respect to each pixel configuring the bitmap image data.

Figure 24:
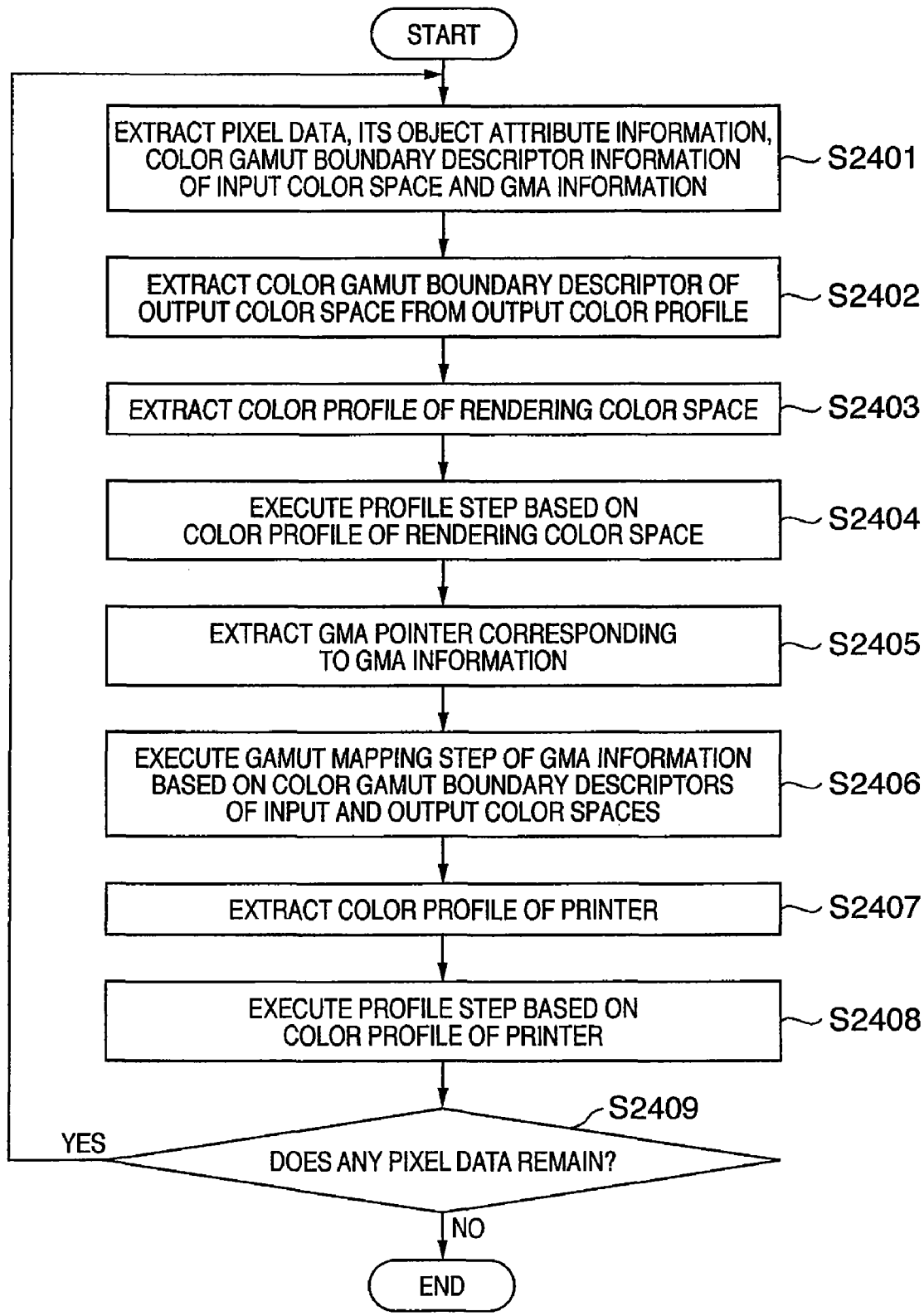
FIG. 24 is a flowchart showing a detailed process of S2105 shown in FIG. 21.

FIG. 24 is a flowchart showing a detailed process of S2105 shown in FIG. 21. First, the pixel data, object attribute information on the pixel data, the color gamut boundary descriptor of the input color space, and the GMA information are extracted (S2401) from the bitmap storage unit 1817 and the attribute information storage unit 1818, and the color gamut boundary descriptor of the output color space is extracted from the output color profile (S2402). Then the color profile of the rendering color space is extracted (S2403), and the profile step is executed based on the color profile of the rendering color space (S2404).

Next, a GMA pointer corresponding to the GMA information is extracted (S2405), and the gamut mapping step of the GMA information is executed based on the color gamut boundary descriptors of the input and output color spaces (S2406). Finally, the color profile of the printer is extracted (S2407), and the profile step is executed based on the color profile of the printer (S2408). While the pixel data exists (YES at S2409), the process of the above described S2401 to S2407 is repeated. When there is not any pixel data (No at S2409), this process is terminated.

In this way, using the object attribute, the color gamut boundary descriptor of the input color space, and the GMA information as the attribute information with respect to each pixel of the expanded bitmap image data, it is possible to perform the gamut mapping processing from the rendering color space data into color space data of the printer, with respect to the color profiles of the rendering color space and the printer.

According to this embodiment, it is possible to approximate a monitor display and an appearance of a printer output at a portion of the α blending, compared to a conventional process, by introducing the mechanism for performing the gamut mapping after implementing the α blending function in the rendering color space.

Furthermore, compared to the color matching using the ICC profile, since it becomes possible to perform the color matching based on the color space information of the input and output devices, a print output with an improved matching accuracy can be expected.

Modification to the Embodiment

Figure 25:
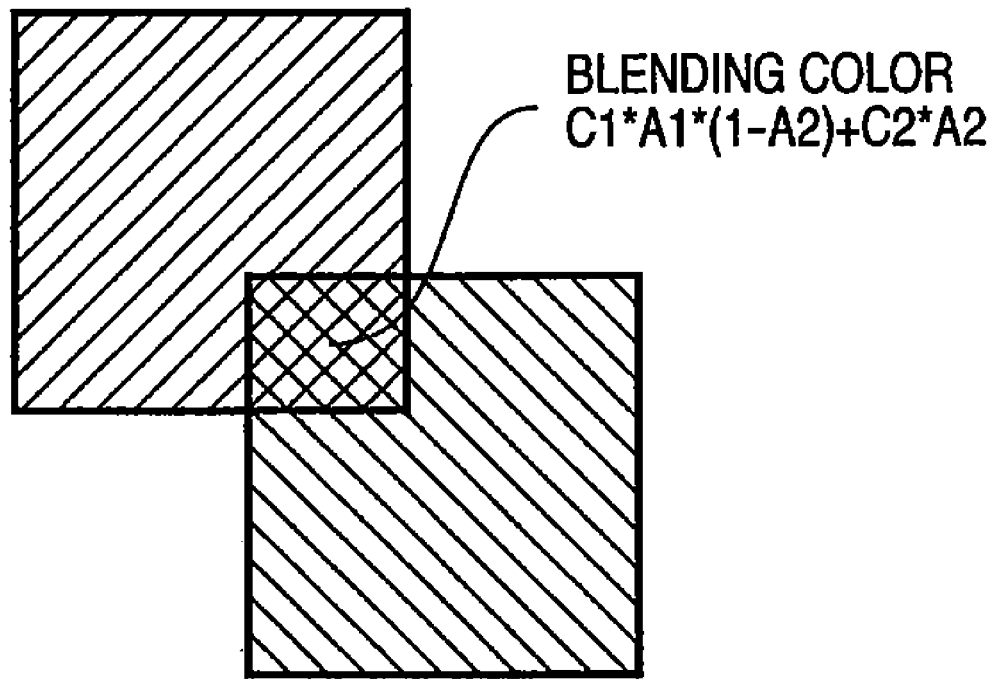
FIG. 25 is a diagram for illustrating a conventional α blending.

Next, a modification example of this embodiment will be described in detail with reference to the drawings. In the above described embodiment, the case has been described by way of example, where the α blending is performed with respect to two colors of the same a value in the color space in which the rendering is performed before data compression is performed in the color reproduction range. However in the modification example as shown in FIG. 25, the case will be described by way of example, where the α blending is performed with respect to a color C1 having the α value of A1 and a color C2 having the a value of A2. In this case, a blending color at an overlapping portion can be represented with the following expression:

$$C1*A1*(1-A2)+C2*A2.$$

Figure 26:
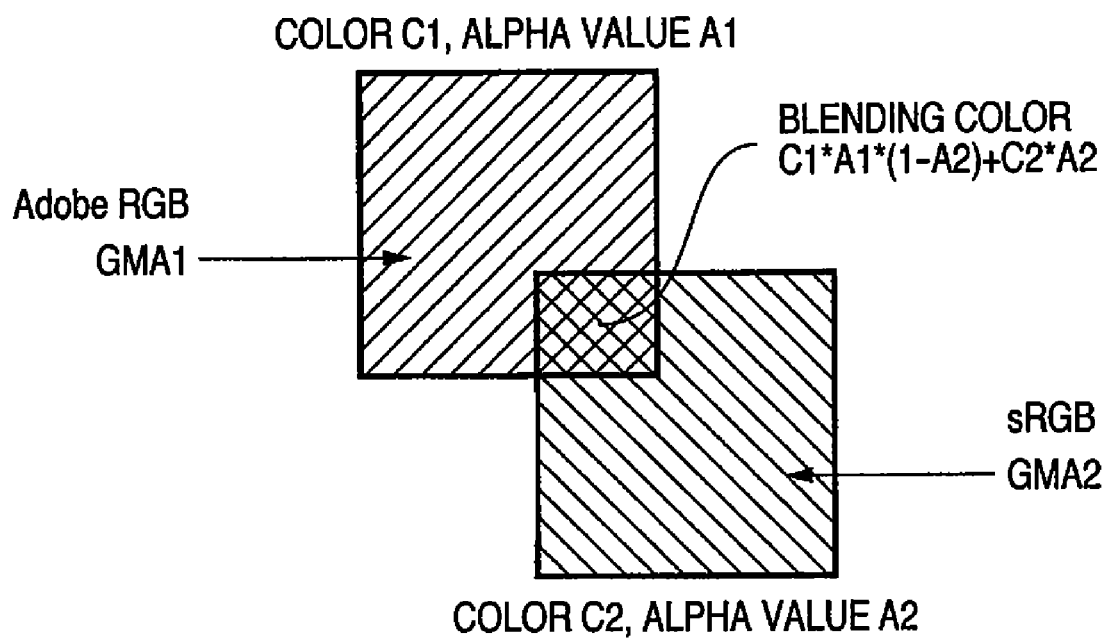
FIG. 26 is a diagram for illustrating a problem in a pixel process of the conventional α blending.

Here, as shown in FIG. 26, an object having the color C1 is raster image data shot by a digital camera, and the raster image data is image data of Adobe RGB color space. A gamut mapping method is designated at GMA1. An object having the color C2 is vector graphics data of sRGB, and gamut mapping method of this object is designated at GMA2. The case of the α blending between the objects having colors 1 and 2 will be considered.

In the case of this modification example, it becomes problematic which GMA and which color gamut can appropriately process a portion on which a pixel process of the α blending is performed.

Figure 27:
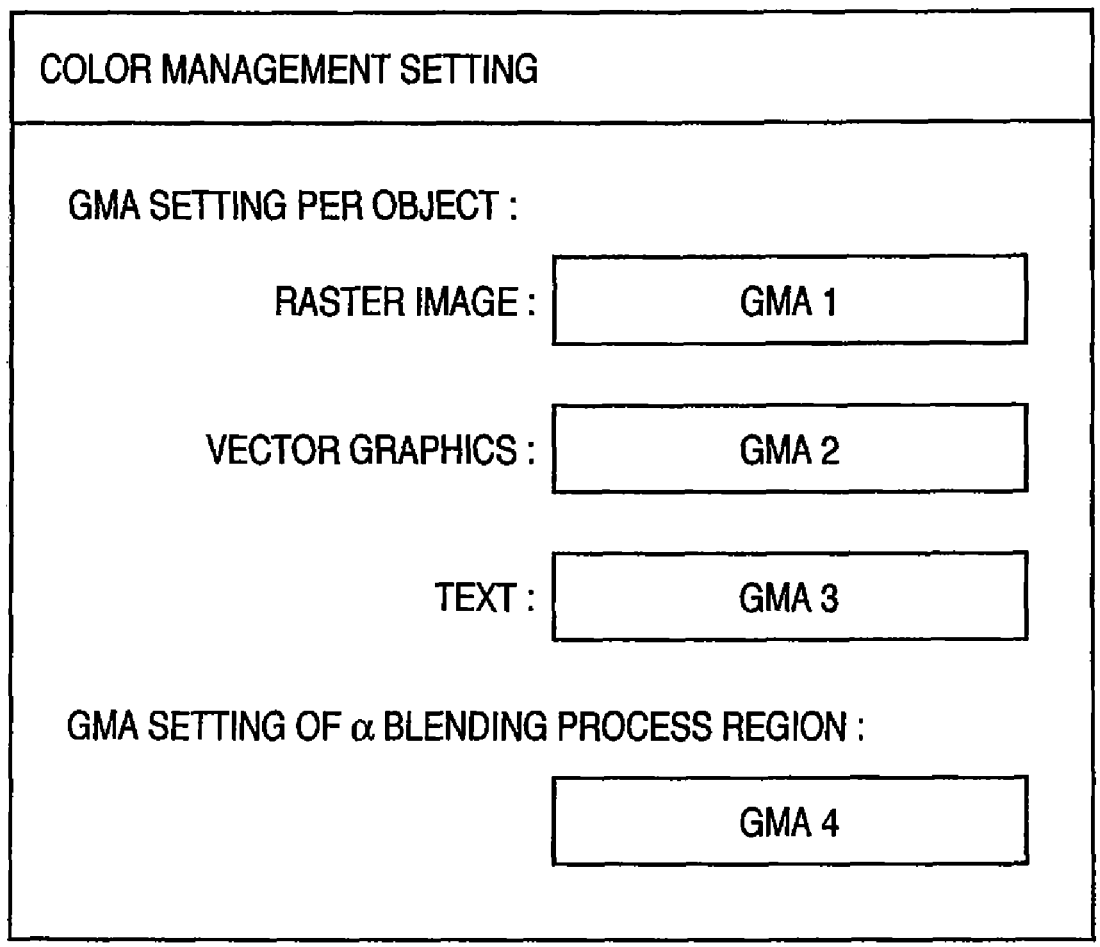
FIG. 27 is a diagram showing an example of a user interface in a modification example.

With respect to the GMA which can appropriately process the portion on which the pixel process of the α blending is performed, as shown in FIG. 27, a user interface is provided in which the user can select an appropriate GMA among a plurality of GMAs, and a mechanism is provided for applying the selected GMA with respect to the data after the rendering.

Moreover, in order to appropriately process the α blending of color 1 and color 2 in units of pixel, the process in units of pixel is implemented in the rendering color space. Because, if color spaces of two colors differ each other, it is unclear whether or not a result of the α blending surely enters the color gamut designated at each object. For example, there is a case where a result of the α blending does not enter the color gamut of sRGB when the color 1 is Adobe RGB and the color 2 is sRGB.

It should be noted that a configuration of the modification example is similar to the configuration described with FIG. 18 in the above described embodiment, and therefore the description of the configuration of the modification example is omitted.

Figure 28:
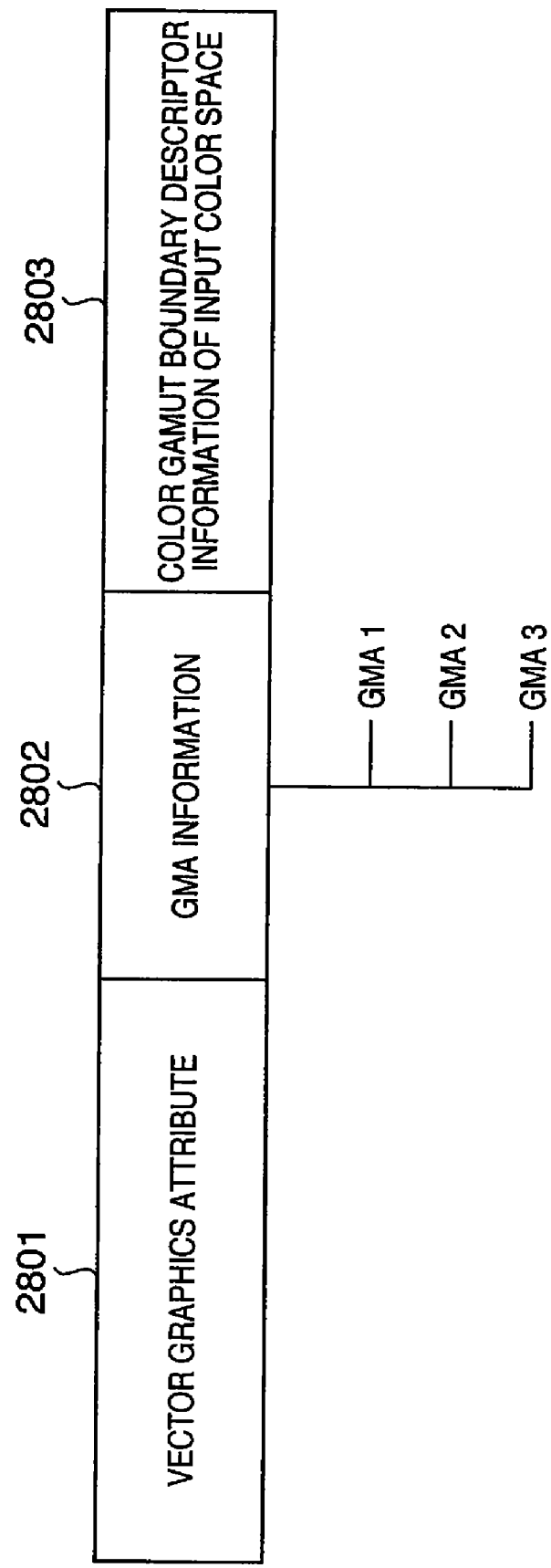
FIG. 28 is a diagram showing a configuration example of the intermediate data to be stored in the intermediate data storage unit 1813 of the modification example.

FIG. 28 is a diagram showing a configuration example of the intermediate data to be stored in the intermediate data storage unit 1813 of the modification example. As shown in FIG. 28, the intermediate data is configured with attribute information 2801 which the object has, GMA information 2802 which has been set at the color management setting unit 1811 with the UI shown in FIG. 27, and color gamut boundary descriptor information of the input color space 2803.

Figure 29:
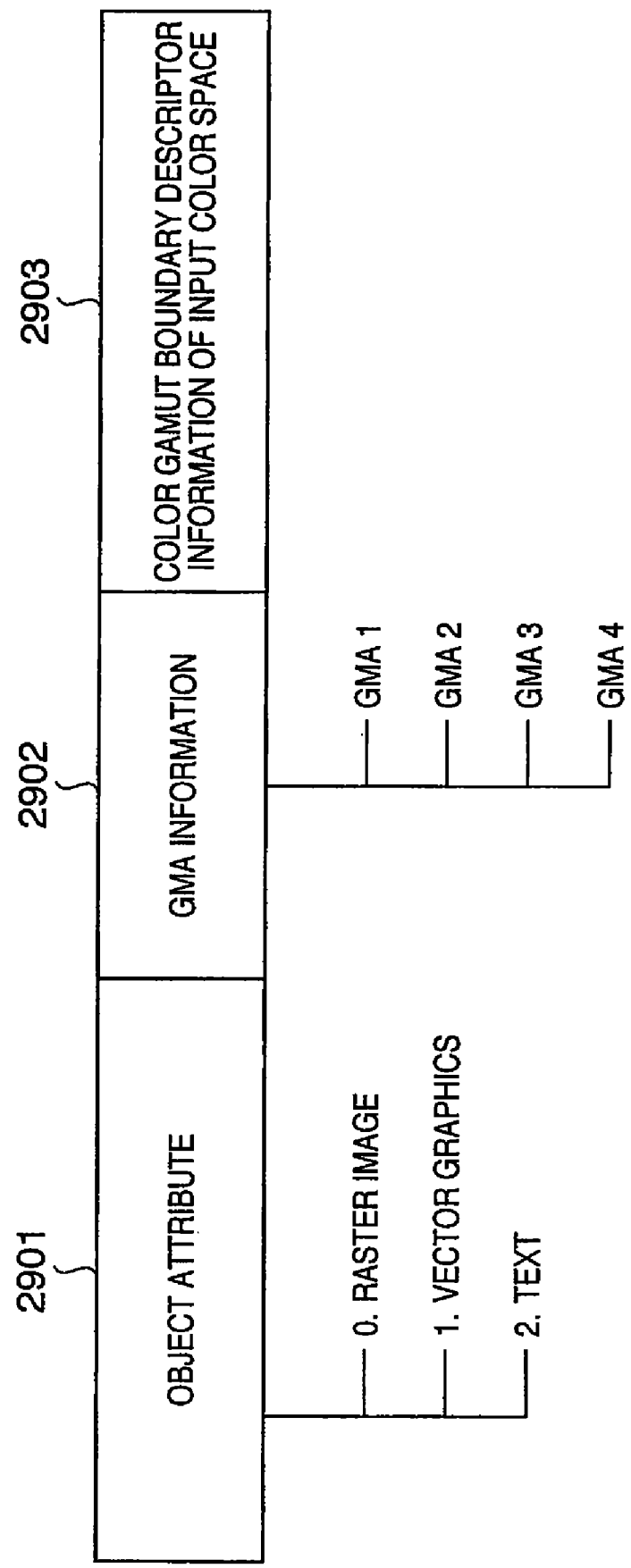
FIG. 29 is a diagram showing a configuration example of the attachment information to be stored in the attribute information storage unit 1818 of the modification example.

FIG. 29 is a diagram showing a configuration example of the attachment information to be stored in the attribute information storage unit 1818. It should be noted that the attachment information is created for each pixel with respect to the pixel data, when the color management processing unit 1816 expands the data into the bitmap image data.

The attachment information, as shown in FIG. 29, is configured with data for indicating the type of the object 2901, GMA information 2902 which has been set at the color management setting unit 1811 with the UI shown in FIG. 27, and color gamut boundary descriptor information of the input color space 2903.

Next, the image output process using the front-end server 1801 and the printer engine 1802 in the modification example will be described.

It should be noted that the image output process is similar to the process described with FIG. 21 in the above described embodiment, and thereby only points of difference will be described here.

Figure 30:
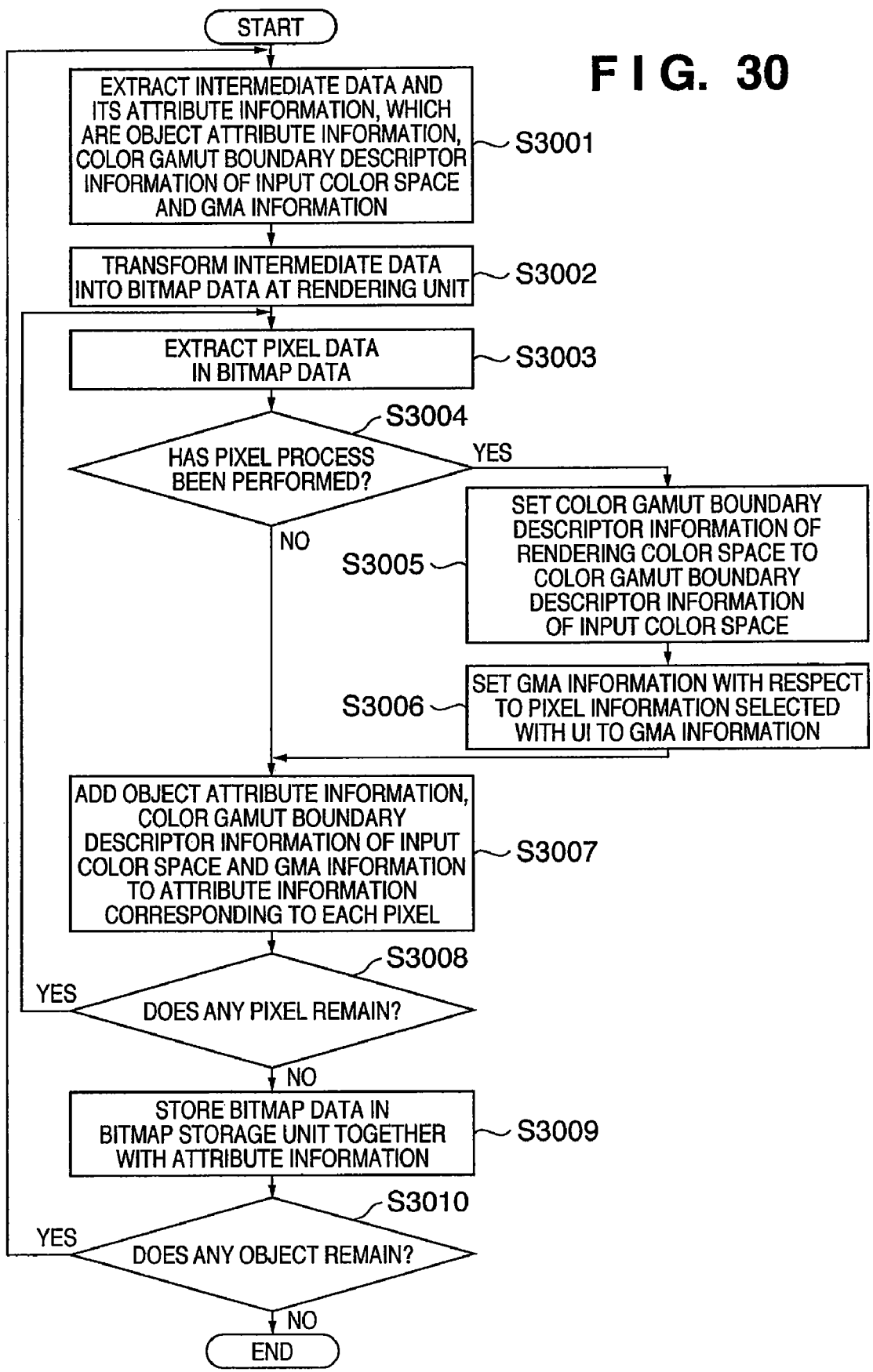
FIG. 30 is a flowchart showing a detailed process of S2104 shown in FIG. 21 in the modification example.

FIG. 30 is a flowchart showing a detailed process of S2104 shown in FIG. 21 in the modification example. First, the intermediate data and its attribute information, which are the object attribute information, the color gamut boundary descriptor information of the input color space and the GMA information, are extracted (S3001). Then, the intermediate data is transformed into the bitmap image data at the rendering unit 1815 (S3002), and the pixel data in the bitmap image data is extracted (S3003). Here, it is determined whether or not the pixel process has been performed (S3004). If the pixel process has been performed, the color gamut boundary descriptor information of the rendering color space is set to the color gamut boundary descriptor information of the input color space (S3005). Then the GMA information with respect to pixel information selected with the UI shown in FIG. 27 is set to the GMA information 2902 shown in FIG. 29 (S3006).

On the contrary, if the pixel process has not been performed, the process of S3005 and S3006 is not performed and the process proceeds to the next process. Then the object attribute information, the color gamut boundary descriptor information of the input color space and the GMA information are added to the attribute information corresponding to each pixel (S3007). While the pixel to be processed exists, the above described process of S3003 to S3007 is repeated (S3008), and when there is not any pixel, the process proceeds to the next process. Here the bitmap image data is stored in the bitmap storage unit 1817 together with the attribute information (S3009). Then while the object to be processed exists (YES at S3010), the above described process of S3001 to S3009 is repeated, and when there is not any object (NO at S3010), this process is terminated.

In this way, it is possible to expand the intermediate data into the bitmap image data, and to set the object attribute, the color gamut boundary descriptor of the input color space, and the GMA information as the attribute information with respect to each pixel configuring the bitmap image data.

According to the modification example, since it becomes possible to use the GMA and the color gamut which can appropriately process the portion on which the pixel process of the α blending is performed, it becomes possible to more approximate the monitor display and the appearance of the printer output at the portion of the α blending.

It should be noted that the present invention may be applied to a system configured with a plurality of devices (for example, a host computer, an interface device, a reader, the printer and the like), or applied to an apparatus consisting of one device (for example, a copying machine, a facsimile machine and the like).

Moreover, of course, the object of the present invention is also attained by supplying a recording medium having recorded thereon a program code of software for realizing the functions of the above described embodiment, to the system or the apparatus, and reading and executing the program code stored on the recording medium by the computer (a CPU or an MPU) of the system or the apparatus.

In this case, the program code itself read from the recording medium would realize the functions of the above described embodiment, and the recording medium having recorded thereon the program code would configure the present invention.

For the recording medium for supplying this program code, for example, it is possible to use a floppy® disk, a hard disk, an optical disk, a magneto optical disk, a CD-ROM, a CD-R, a magnetic tape, a non-volatile memory card, a ROM and the like.

Moreover, of course, not only the case where the functions of the above described embodiment are realized by executing the read program code by the computer, but also the case is included where an operating system (OS) operating on the computer or the like performs some or all of actual processes based on instructions of the program code and the functions of the above described embodiment are realized by the processes.

Furthermore, of course, the case is also included where, after the program code read from the recording medium is written into a function expansion board inserted into the computer or a memory provided on a function expansion unit connected to the computer, the CPU or the like provided on the function expansion board or the function expansion unit performs some or all of actual processes based on the instructions of the program code and the functions of the above described embodiment are realized by the processes.

According to the present invention, it is possible to match the color gamuts of the input and output devices with respect to the overlapping portion of the objects having different colors.

Although the present invention has been described above with preferred examples, the present invention is not limited to the above described examples, and various modifications are possible within the scope of the claims.

This application claims the benefit of Japanese Patent Application No. 2005-167349 filed on Jun. 7, 2005, which is hereby incorporated by reference herein in its entirety.

What is claimed is:

1. An image processing apparatus comprising:
    intermediate data generation means for generating intermediate data in which information relating to a gamut mapping algorithm is added for each object described by a description language including at least an α blending;
    rendering means for performing a rendering of the intermediate data into bitmap data for each object and for adding the information relating to the gamut mapping algorithm to each pixel of the bitmap data; and
    color space compression means for performing, according to the information relating to the gamut mapping algorithm added to each pixel, color space compression from each pixel of the bitmap data into color space data of a printer,
    wherein the α blending is performed between an object of a first color space and an object of a second color space different from the first color space, and
    wherein the color space compression of the α blended object is performed according to information relating to a gamut mapping algorithm for the α blending.

2. The apparatus according to claim 1, wherein the intermediate data generation means adds attribute information of the object to attribute information of the intermediate data.

3. The apparatus according to claim 1, wherein the information relating to the gamut mapping algorithm includes color gamut information of an input color space.

4. The apparatus according to claim 1, further comprising setting means for setting the information relating to the gamut mapping algorithm at a pixel portion in which the gamut mapping is performed in units of pixel,
    wherein the setting means sets the information relating to a gamut mapping algorithm to an α blending object besides a graphics object.

5. The apparatus according to claim 1, wherein the description language is Scalable Vector Graphics data.

6. The apparatus according to claim 1, wherein the intermediate data generation means generates the intermediate data after the gamut mapping of Colorimetric is performed for each object described by the description language.

7. An image processing method comprising:
    an intermediate data generation step of generating intermediate data in which information relating to a gamut mapping algorithm is added for each object described by a description language including at least an α blending;
    a rendering step of performing a rendering of the intermediate data into bitmap data for each object and for adding the information relating to the gamut mapping algorithm to each pixel of the bitmap data; and
    a color space compression step of performing, according to the information relating to the gamut mapping algorithm added to each pixel, color space compression from each pixel of the bitmap data into color space data of a printer,
    wherein the α blending is performed between an object of a first color space and an object of a second color space different from the first color space, and
    wherein the color space compression of the α blended object is performed according to information relating to a gamut mapping algorithm for the α blending.

8. The method according to claim 7, wherein the intermediate data generation step adds attribute information of the object to attribute information of the intermediate data.

9. The method according to claim 7, wherein the information relating to the gamut mapping algorithm includes color gamut information of an input color space.

10. The method according to claim 7, further comprising a setting step of setting the information relating to the gamut mapping algorithm at a pixel portion in which the gamut mapping is performed in units of pixel,
    wherein the setting step sets the information relating to a gamut mapping algorithm to an α blending object besides a graphics object.

11. The method according to claim 7, wherein the description language is Scalable Vector Graphics data.

12. The apparatus according to claim 7, wherein the intermediate data generation step generates the intermediate data after the gamut mapping of Colorimetric is performed for each object described by the description language.

13. A computer readable recording medium having recorded thereon a program for causing a computer to execute the image processing method according to claim 7.

* * * * *